United States Patent
Lopez et al.

(10) Patent No.: US 12,378,165 B2
(45) Date of Patent: Aug. 5, 2025

(54) PESTICIDE FORMULATION COMPRISING MFC AS RHEOLOGY MODIFIER

(71) Applicant: AMVAC Chemical Corporation, Newport Beach, CA (US)

(72) Inventors: Humberto Benito Lopez, Chino Hills, CA (US); Lisiane Zeni, Newport Beach, CA (US); Jonny Martinez, Newport Beach, CA (US)

(73) Assignee: AMVAC CHEMICAL CORPORATION, Newport Beach, CA (US)

( * ) Notice: Subject to any disclaimer, the term of this patent is extended or adjusted under 35 U.S.C. 154(b) by 0 days.

(21) Appl. No.: 16/751,410

(22) Filed: Jan. 24, 2020

(65) Prior Publication Data

US 2020/0236926 A1    Jul. 30, 2020

Related U.S. Application Data

(60) Provisional application No. 62/916,764, filed on Oct. 17, 2019, provisional application No. 62/896,762, filed on Sep. 6, 2019, provisional application No. 62/797,124, filed on Jan. 25, 2019.

(51) Int. Cl.

| | | |
|---|---|---|
| A01N 25/30 | (2006.01) | |
| A01N 25/02 | (2006.01) | |
| A01N 25/04 | (2006.01) | |
| A01N 25/26 | (2006.01) | |
| A01N 25/28 | (2006.01) | |
| A01N 53/00 | (2006.01) | |
| A01N 57/12 | (2006.01) | |
| C05B 15/00 | (2006.01) | |
| C05G 3/40 | (2020.01) | |
| C05G 3/60 | (2020.01) | |
| C05G 5/12 | (2020.01) | |
| C05G 5/18 | (2020.01) | |
| C05G 5/20 | (2020.01) | |
| C08L 1/02 | (2006.01) | |

(52) U.S. Cl.
CPC .............. *C05B 15/00* (2013.01); *A01N 25/02* (2013.01); *A01N 25/04* (2013.01); *A01N 25/26* (2013.01); *A01N 25/30* (2013.01); *A01N 53/00* (2013.01); *A01N 57/12* (2013.01); *C05G 3/44* (2020.02); *C05G 3/60* (2020.02); *C05G 5/12* (2020.02); *C05G 5/18* (2020.02); *C05G 5/20* (2020.02); *C08L 1/02* (2013.01)

(58) Field of Classification Search
CPC ........ A01N 53/00; A01N 57/12; A01N 25/30; A01N 25/04; A01N 25/26; A01N 25/28; C05G 5/20; C05G 3/44; C05G 5/12; C05B 15/00; C08L 1/02
See application file for complete search history.

(56) References Cited

U.S. PATENT DOCUMENTS

| | | | |
|---|---|---|---|
| 4,341,807 A | 7/1982 | Turbak et al. | |
| 4,374,702 A | 2/1983 | Turbak et al. | |
| 4,481,077 A | 11/1984 | Herrick | |
| 5,185,024 A | 2/1993 | Siemer et al. | |
| 5,385,640 A | 1/1995 | Weibel et al. | |
| 5,405,953 A * | 4/1995 | Banker ................... | A01N 25/10 536/120 |
| 5,614,558 A | 3/1997 | James et al. | |
| 8,420,573 B2 | 4/2013 | Stern | |
| 8,807,870 B2 | 8/2014 | Laukkanen et al. | |
| 11,358,905 B2 | 6/2022 | Lopez et al. | |
| 2005/0034636 A1 | 2/2005 | Schlesiger et al. | |
| 2005/0260240 A1 | 11/2005 | Narayanan et al. | |
| 2007/0027108 A1 | 2/2007 | Yang et al. | |
| 2009/0143447 A1* | 6/2009 | Arthur .................... | A01N 25/00 514/370 |
| 2010/0120617 A1* | 5/2010 | Dyllick-Brenzinger ..................... | C11D 17/0039 504/100 |
| 2010/0160168 A1 | 6/2010 | Lindner | |
| 2013/0108373 A1* | 5/2013 | Laukkanen ............ | C09K 17/48 405/128.7 |
| 2013/0137578 A1 | 5/2013 | Xu et al. | |
| 2013/0331267 A1 | 12/2013 | Aulisa | |
| 2014/0011675 A1 | 1/2014 | Knochenmus et al. | |
| 2014/0066303 A1 | 3/2014 | Liu et al. | |
| 2014/0274719 A1 | 9/2014 | Davison | |
| 2014/0342905 A1 | 11/2014 | Bullis et al. | |
| 2015/0133296 A1 | 5/2015 | Ugalde Martinez et al. | |
| 2015/0239788 A1 | 8/2015 | Yamashita | |
| 2016/0032168 A1 | 2/2016 | Al-Bagoury et al. | |

(Continued)

FOREIGN PATENT DOCUMENTS

| | | |
|---|---|---|
| CN | 102100229 A | 6/2011 |
| CN | 104082287 A | 10/2014 |

(Continued)

OTHER PUBLICATIONS

SciFinder. (2021). *Microfibrillated celluloses and Fertilizers*. [Search Results]. Retrieved Jul. 15, 2021, 210 pages.
SciFinder. (2021). *Microfibrillated celluloses and Rheology Modifier and Pesticide*. [Search Results]. Retrieved Jul. 15, 2021, 4 pages.
"SmartChoice™ HC" Safety Data Sheet. AMVAC. 1449 Version #: 3.0, Revision date May 9, 2018, Issue date Apr. 6, 2016. 11 pages.
CAS Registry No. 11138-66-2, date accessed Apr. 20, 2020. 1 page.

(Continued)

*Primary Examiner* — Johann R Richter
*Assistant Examiner* — Danielle Johnson
(74) *Attorney, Agent, or Firm* — Mintz, Levin, Cohn, Ferris, Glovsky and Popeo, P.C.

(57) ABSTRACT

Described herein, inter alia, is a composition comprising an agricultural agent in particulate form and a microfibrillated cellulose, and methods of making and using the aforementioned composition.

21 Claims, No Drawings

(56) References Cited

U.S. PATENT DOCUMENTS

| | | |
|---|---|---|
| 2016/0227782 A1 | 8/2016 | Oevreboe et al. |
| 2017/0121908 A1 | 5/2017 | Holtan et al. |
| 2017/0273298 A1 | 9/2017 | Rosenberg Read et al. |
| 2017/0369386 A1 | 12/2017 | Dave et al. |
| 2018/0094214 A1 | 4/2018 | Labib et al. |
| 2018/0265425 A1* | 9/2018 | Li .................... B01J 13/16 |
| 2020/0239375 A1 | 7/2020 | Lopez et al. |
| 2020/0260721 A1 | 8/2020 | Lopez et al. |
| 2020/0392051 A1 | 12/2020 | Casalins Cunado |
| 2021/0127684 A1 | 5/2021 | Singh et al. |

FOREIGN PATENT DOCUMENTS

| | | | |
|---|---|---|---|
| CN | 104082290 | A | 10/2014 |
| CN | 105026477 | A | 11/2015 |
| CN | 105229228 | A | 1/2016 |
| CN | 106132448 | A | 11/2016 |
| CN | 107318839 | A | 11/2017 |
| CN | 108347920 | A | 7/2018 |
| EP | 0 298 136 | A1 | 1/1989 |
| GB | 2282327 | B | 1/1998 |
| JP | S59-039789 | A | 3/1984 |
| JP | 2002-502907 | A | 1/2002 |
| JP | 2006-503061 | A | 1/2006 |
| JP | 2009-067910 | A | 4/2009 |
| JP | 2009-530289 | A | 8/2009 |
| JP | 2010-505798 | A | 2/2010 |
| JP | 2011-057571 | A | 3/2011 |
| JP | 2012-519689 | A | 8/2012 |
| JP | 2013-082796 | A | 5/2013 |
| JP | 2014-521770 | A | 8/2014 |
| JP | 2014-524963 | A | 9/2014 |
| JP | 2016-069293 | A | 5/2016 |
| JP | 2016-069294 | A | 5/2016 |
| JP | 2016-069295 | A | 5/2016 |
| JP | 2016-515643 | A | 5/2016 |
| JP | 2017-519909 | A | 7/2017 |
| JP | 2018-508471 | A | 3/2018 |
| JP | 2018-517756 | A | 7/2018 |
| JP | 2020-510080 | A | 4/2020 |
| WO | WO-99/55645 | A1 | 11/1999 |
| WO | WO-01/66600 | A1 | 9/2001 |
| WO | WO-2007/091942 | A1 | 8/2007 |
| WO | WO-2013/154675 | A1 | 10/2013 |
| WO | WO-2014/203121 | A1 | 12/2014 |
| WO | WO-2015/180844 | A1 | 12/2015 |
| WO | WO-2016/202500 | A1 | 12/2016 |
| WO | WO-2017/148990 | A1 | 9/2017 |
| WO | WO-2019/035881 | A1 | 2/2019 |
| WO | WO-2019/035881 | A8 | 2/2020 |
| WO | WO-2020/109654 | A1 | 6/2020 |
| WO | WO-2020/254891 | A1 | 12/2020 |

OTHER PUBLICATIONS

CAS Registry No. 141-43-5, date accessed Apr. 20, 2020. 1 page.
CAS Registry No. 2634-33-5, date accessed Apr. 20, 2020. 1 page.
CAS Registry No. 54593-83-8, date accessed on Apr. 20, 2020. 1 page.
CAS Registry No. 57-55-6, date accessed Apr. 20, 2020. 1 page.
CAS Registry No. 64742-94-5, date accessed Apr. 20, 2020. 1 page.
CAS Registry No. 7732-18-5, date accessed Apr. 20, 2020. 1 page.
CAS Registry No. 82657-04-3, date accessed Apr. 20, 2020. 1 page.
CAS Registry No. 9004-34-6, date accessed Apr. 20, 2020. 4 pages.
Castro, M.J.L. et al. (2013). "Surfactants in Agriculture. Chapter 7—Green Materials for Energy, Products and Depollution, Environmental Chemistry for a Sustainable World 3." pp. 287-334.
International Search Report and Written Opinion issued in International Application No. PCT/US20/15084, mailed Apr. 16, 2020 (Apr. 16, 2020). 8 pages.
International Search Report and Written Opinion issued in International Application No. PCT/US20/15086, mailed Mar. 31, 2020 (Mar. 31, 2020). 9 pages.
International Search Report and Written Opinion issued in International Application No. PCT/US20/15088, mailed Jun. 4, 2020 (Jun. 4, 2020). 12 pages.
U.S. Appl. No. 16/751,423, filed Jan. 24, 2020, Lopez et al.
U.S. Appl. No. 16/751,441, filed Jan. 24, 2020, Lopez et al.
Sena-Vélez, M. et al. (2015). "Biofilm formation and motility of Xanthomonas strains with different citrus host range." Plant Pathology, 64: 767-775.
Bifenthrin, Technical Fact Sheet, [online], Aug. 6, 2018, 4 pages, URL:https://web.archive.org/web/20180806182306/http://npic.orst.edu/factsheets/archive/biftech.
Chemistry Handbook, Applied Chemistry, 7th Edition, Jan. 30, 2014, pp. 887. [Best available copy].
Chlorethoxyfos C6H11CI4O3PS CID 91655, PubChem, [online], Aug. 8, 2005, 4 pages. URL: https://pubchem.ncbi.nlm.nih.gov/compound/Chlorethoxyfos.

* cited by examiner

PESTICIDE FORMULATION COMPRISING MFC AS RHEOLOGY MODIFIER

CROSS-REFERENCES TO RELATED APPLICATIONS

This application claims the benefit of provisional application Ser. No. 62/797,124 filed Jan. 25, 2019, provisional application Ser. No. 62/896,762 filed Sep. 6, 2019, and provisional application Ser. No. 62/916,764 filed Oct. 17, 2019, each of which are incorporated herein by reference.

BACKGROUND OF THE INVENTION

A common problem in the use of conventional rheology modifiers in agricultural formulation is agglomeration when generating tank mixes with undiluted liquid fertilizers, micronutrients and other highly ionic media. The solids from such agglomeration can cause clogging of equipment, resulting in undesired, premature materials separation. Physical incompatibility occurs most frequently when the tank mixture forms agglomerates due to, for example, coagulation, flocculation, gelling, or precipitation of crystals. The mixtures may form hard packed agglomerates or oil globules. Physical incompatibility presents difficulties because the malfunctioning tank-mixture plugs conventional spray filters and nozzles.

BRIEF SUMMARY OF THE INVENTION

In some aspects, embodiments herein relate to compositions comprising a capsule suspension (CS) of a mixture of chlorethoxyfos and bifenthrin in a liquid phase, the mixture being disposed within an encapsulating wall, the composition further comprising a polymeric dispersant, microfibrillated cellulose, and optionally ethanolamine.

In some aspects, embodiments herein relate to compositions comprising an agricultural agent in particulate form and a microfibrillated cellulose, wherein the particulate form is selected from the group consisting of a liquid droplet, a gel, or a combination thereof, and wherein the agricultural agent in particulate form are part of an emulsifiable concentrate (EC), a capsule suspension (CS), a suspo-emulsion (SE), a microemulsion (ME), or an oil dispersion (OD).

In some aspects, embodiments herein relate to methods of treating a crop comprising providing a composition comprising an agricultural agent in particulate form, and a microfibrillated cellulose, wherein the particulate form is selected from the group consisting of a liquid droplet, a gel, or a combination thereof, and wherein the agricultural agent in particulate form are part of an emulsifiable concentrate (EC), a capsule suspension (CS), a suspo-emulsion (SE), a microemulsion (ME), or an oil dispersion (OD), the method comprising adding to the composition a fertilizer and water to provide a mixture and applying the mixture to a crop.

DETAILED DESCRIPTION OF THE INVENTION

The present embodiments employ microfibrillated cellulose (MFC) in conjunction with polymeric dispersants to reduce or eliminate the need for conventional rheology modifiers in agricultural suspension formulations. Although certain embodiments relate to specific capsule suspension formulations of insecticides, those skilled in the art will recognize the ability to apply the embodiments to other types of agricultural active compounds and particulate forms, as described herein.

Surprisingly, it has been discovered that rheology modifier MFC provides stable formulations of capsule suspensions, even in the presence of highly ionic media or in the presence of multivalent cations that are not compatible with conventional rheology modifiers such as xanthan gum and guar gum. These and other advantages will be apparent to those skilled in the art.

I. DEFINITIONS

The abbreviations used herein generally comport with their conventional meaning within the chemical and biological arts. Unless specifically indicated otherwise, all technical and scientific terms used herein have the same meaning as commonly understood by those of ordinary skill in the art. In addition, any method or material similar or equivalent to a method or material described herein can be used in the practice of the embodiments disclosed herein. For purposes of the present embodiments, the following terms are defined.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

"Composition" as used herein is intended to encompass a product comprising the specified ingredients in the specified amounts, as well as any product, which results, directly or indirectly, from combination of the specified ingredients in the specified amounts.

As used herein, "agricultural agent" refers to a compound, biological, or substrate which has any effect on agricultural crops, including agriculturally active compounds having pesticidal effects, herbicidal effects, and the like, as well as compounds, biologicals, or substrates that provide useful adjuvancy, plant nutrition value, and the like, such as biostimulants, fertilizers, and micronutrients.

In general, agricultural active compounds may be provided in "particulate form." As used herein, "particulate form" may include encapsulated agricultural active compounds (to form capsule suspensions), gels, wettable powders (WP), water dispersible powders for slurry seed treatment (WS), water dispersible granules (WG), emulsifiable granules (EG), and emulsifiable powders (EP). Gels include any organic polymer capable of forming gel particles, such as acrylic acid based gels, including polyacrylamide, polyammonium acrylate and the like. Examples of such gels are disclosed in U.S. Pat. No. 5,185,024, which is incorporated herein by reference in its entirety. WP particulates are homogenous solids of an agricultural active together with optional fillers and other formulation ingredients in a fine powder form, generally free of visible extraneous matter and hard lumps. WS particulates are homogeneous solids of an agricultural active together with a carrier and other formulation ingredients, typically including a colorant, and in the form of a powder, generally free of visible extraneous matter and hard lumps. WG particulates are homogeneous solids of an agricultural active together with carriers and other formulation ingredients and typically designed to disintegrate in water to form a colloidal suspension. WG are generally free-flowing, mostly dust free, and generally free of visible extraneous matter and hard lumps. EG particulates are granules of an agricultural active which may be dissolved in an organic solvent together with other formulation ingredients. EG particulates are generally homogenous, and generally free of visible extraneous matter and hard lumps. EP particulates are homogenous mixtures of an agricultural active together with other formulation ingredients and supplied free-flowing powder generally free of visible extraneous matter and hard lumps, and which form an emulsion upon dilution with water.

As used herein, the term "dry matter weight concentration" refers to the absolute weight percent of MFC, excluding water and other absorbed liquids in the formulation. The term "dry matter," or "solids content," in the context of the amount of MFC refers to the amount of MFC if all the solvent (typically water) is removed. Accordingly, providing the amount of MFC as a concentration of "dry matter" provides the amount as "% w/w" relative to the overall weight of the composition in the absence of solvent.

As used herein, "thixotropy" refers to a time-dependent shear thinning property of a composition. A composition exhibits thixotropy when it is viscous under static conditions but flows (e.g., becomes thinner, becomes less viscous) over time when subjected to an applied stress, such as being shaken, agitated, pumped, mixed or subjected to shear-stress.

"Microfibrillated cellulose," or "MFC," (also known as "reticulated" cellulose or as "superfine" cellulose, or as "cellulose nanofibrils") is a cellulose-based product and is described, for example, in U.S. Pat. Nos. 4,481,077, 4,374,702 and 4,341,807, each of which is incorporated herein by reference. In embodiments, microfibrillated cellulose has reduced length scales (diameter, fibril length) vis-à-vis cellulose fibers, improved water retention and adjustable viscoelastic properties. MFC with improved or tailored properties for specific applications are known, such as those disclosed in WO 2007/091942 and WO 2015/180844, each of which is incorporated herein by reference.

Microfibrillated cellulose (MFC) is a product derived from cellulose and is commonly manufactured in a process in which cellulose fibers are opened up and unraveled to form fibrils and microfibrils/nanofibrils by (repeated) passage through a geometrical constraint. For example, MFC may be produced as disclosed in WO 2015/180844 by passing a liquid composition of cellulose through a small diameter orifice in which the composition is subjected to a pressure drop of at least 3000 psig and a high velocity shearing action followed by a high velocity decelerating impact. The passage of the MFC composition through the orifice is repeated until the cellulose composition becomes a substantially stable composition. This process converts the cellulose into microfibrillated cellulose, which has valuable physical properties (gel forming capability, thixotropic properties, high water retention value WRV and the like) without substantial chemical change of the cellulose starting material.

Another process for manufacturing microfibrillated cellulose is described in U.S. Pat. No. 5,385,640 which discloses a means for refining fibrous cellulosic material into a dispersed tertiary level of structure and thereby achieving desirable properties attendant with such structural change. The cellulosic fiber produced in this way is referred to as "microdenominated cellulose (MDC)", a sub-group of microfibrillated cellulose. Such microfibrillated cellulose is obtained by repeatedly passing a liquid composition of fibrous cellulose through a zone of high shear, which is defined by two opposed surfaces, with one of the surfaces rotating relative to the other, under conditions and for a length of time sufficient to render the composition substantially stable and to impart to the composition a water retention that shows consistent increase with repeated passage of the cellulose composition through the zone of high shear. This process increases the viscosity and leads to a gel structure, until no further increase in viscosity is achieved. After such a treatment, homogeneous MFC is obtained and the conversion of cellulose to microcellulose as such is concluded.

"Microfibrillated cellulose" (MFC) in accordance with embodiments disclosed herein is to be understood as relating to cellulose fibers that have been subjected to a mechanical treatment resulting in an increase of the specific surface and a reduction of the size of cellulose fibers, in terms of cross-section (diameter) and/or length, wherein said size reduction leads to "fibrils" having a diameter in the nanometer range and a length in the micrometer range.

The starting cellulose material to generate MFC does not contain a significant portion of individualized and "separated" cellulose "fibrils." The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 microns (with the length of these fibres being even greater). When the cellulose fibres are microfibrillated, a heterogeneous mixture of "released" fibrils with cross-sectional dimensions and lengths from nm to microns may result. Fibrils and bundles of fibrils may co-exist in the resulting microfibrillated cellulose.

Microfibrillated cellulose contains fibrils in constant interaction with each other in a three-dimensional network. The rheological properties of MFC—high viscosity at rest, shear thinning (thixotropic) behavior, water holding capacity—are a result of the existence of this entangled network.

In the MFC products disclosed herein, individual fibrils or fibril bundles can be identified and easily discerned by way of conventional optical microscopy, for example at a magnification of 40× or by use of electron microscopy.

As indicated above any type of microfibrillated cellulose (MFC) may be used in connection with embodiments disclosed herein as long as the fiber bundles as present in the original cellulose pulp are sufficiently separated in the process of making MFC so that the average diameter of the resulting fibrils is in the nanometer-range and therefore more surface of the overall cellulose-based material has been created, vis-à-vis the surface available in the original cellulose material. MFC may be prepared according to any of the processes described in the art, including the references specifically cited above.

In embodiments, the microfibrillated cellulose may be characterized by the following features: The microfibrillated cellulose forms a gel-like dispersion that has a zero shear viscosity, $\eta_0$, of at least 2000 PaS, or at least 3000 Pa·s or 4000 Pa·s, or at least 5000 Pa·s, or at least 6000 Pa·s, or at least 7000 Pa·s, as measured in polyethylene glycol (PEG) as the solvent, and at a solids content of the MFC of about 0.65%.

The rheological properties, in particular zero shear viscosity can be measured on a rheometer of the type Anton Paar Physica MCR 301. The temperature in all measurements can be performed at 25° C. and a "plate-plate" geometry used (diameter: 50 mm). The rheological measurement can be performed as an oscillating measurement (amplitude sweep) to evaluate the degree of structure in the dispersions and as rotational viscosity measurements, in which case the viscosity may be measured as a function of the shear rate to evaluate the viscosity at rest (shear forces→0), as well as the shear thinning properties of the dispersions. The measurement method is further described in PCT/EP2015/001103 (EP 3 149 241).

In embodiments, the microfibrillated cellulose has a water holding capacity (also water retention capacity) of more than 40, or more than 50, or more than 60, or more than 70, or more than 75, or more than 80, or more than 90, further or more than 100. The water holding capacity is given as $(mV/mT)^{-1}$ where mV is the weight of the wet sediment and mT is the weight of dry MFC analyzed. The water holding capacity describes the ability of the MFC to retain water within the MFC structure and this relates to the accessible surface area. The water holding capacity can be measured by diluting the MFC samples to a 0.3% solids content in water and then centrifuging the sample at 1000 G for 15 minutes. The clear water phase can be separated from the sediment and the sediment weighed. The measurement method is further described in PCT/EP2015/001103 (EP 3 149 241).

There is no specific restriction in regard to the origin of the cellulose, and hence of the microfibrillated cellulose employed in embodiments disclosed herein. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g., from tunicates.

In embodiments, wood-based materials are used as raw materials, either hardwood or softwood or both (in mixtures). In embodiments, softwood is used as a raw material, either one kind or mixtures of different soft wood types.

Modified (derivatized) and non-modified (un-derivatized) cellulose/MFC may be employed. In embodiments, the microfibrillated cellulose may be unmodified with respect to its functional groups or may be physically modified or chemically modified, or both.

Chemical modification of the surface of the cellulose microfibrils may be achieved by various possible reactions of the surface functional groups of the cellulose microfibrils such as functionalizing of the hydroxyl groups, including by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

In embodiments, cellulose microfibrils may be modified by a physical route, either by adsorption at the surface, or by spraying, or by coating, or by encapsulation of the microfibril. In embodiments, modified microfibrils can be obtained by physical adsorption of at least one compound. The MFC may also be modified by association with an amphiphilic compound (surfactant).

In embodiments, the microfibrillated cellulose is not physically modified.

In embodiments, the microfibrillated cellulose is a non-modified microfibrillated cellulose, such as a non-modified microfibrillated cellulose derived from plant material.

In embodiments, the microfibrillated cellulose is prepared by a process, which comprises at least the following steps: (a) subjecting a cellulose pulp to at least one mechanical pretreatment step; (b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose; wherein the homogenizing step (b) involves compressing the cellulose pulp from step (a) and subjecting the cellulose pulp to a pressure drop.

The mechanical pretreatment step can include a refining step. The purpose of the mechanical pretreatment is to "beat" the cellulose pulp in order to increase the accessibility of the cell walls, i.e., to increase the surface area.

Prior to the mechanical pretreatment step, or in addition to the mechanical pretreatment step, enzymatic (pre)treatment of the cellulose pulp is an optional additional step that may be desirable for some applications. In regard to enzymatic pretreatment in conjunction with microfibrillating cellulose, the respective content of WO 2007/091942 is incorporated herein by reference. Any other type of pretreatment, including chemical pretreatment may also be performed.

In the homogenizing step (b), which is to be conducted after the (mechanical) pretreatment step, the cellulose pulp slurry from step (a) is passed through a homogenizer at least once, or at least two times, as described, for example, in PCT/EP2015/001103, the respective content of which is hereby incorporated by reference.

As used herein "ionic strength" refers to a measure of the concentration of ions (i.e., electrically charged species) in a solution. For the purpose of determining whether ionic strength is "high," an ionic strength is "high" when conventional rheology modifiers such as xanthan and/or guar gums begin to agglomerate and/or otherwise fail to impart sustained thixotropic character to the composition. "High ionic strength" includes ion concentrations obtained from solutions that are about 5% of saturation in any functional ion. For example, NaCl is soluble in water at saturation at about 360 g/L. Accordingly, a "high ionic strength" relative to NaCl would include 18 g NaCl/L in water. With respect to the performance of MFC compared to such agents as xanthan gum, MFC also benefits from compatibility with cationic surfactants and multivalent cations (which are ubiquitous in micronutrients). With respect to multivalent cations, in particular, the concentrations of these ions need not even be particularly high before xanthan gum or guar gum fail.

As used herein, the term "dispersant" or "dispersing agent," refers to an additive used to prevent flocculation, i.e., to prevent solid particles from sticking together and forming larger agglomerations of particles. Dispersants may be used to maintain a homogeneous (even) distribution of particles, especially in suspension formulations.

As used herein, "polymeric dispersant" refers to a dispersant comprising polymers such as, but not limited to, Envi-Pol 871, acrylic polymers, acrylic copolymers, polyureas, polyisocyanates, polyamines, and polyamides.

As used herein, "anionic polymeric dispersant" refers to a polymeric dispersant which comprises an overall anionic charge on the polymer.

As used herein, "non-ionic polymeric dispersant" refers to a polymeric dispersant which does not have ionic charge on the polymer.

As used herein, "acrylic comb dispersant" refers to acrylic polymeric dispersants wherein the acrylic polymers or copolymers are comb-branched shape polymers or copolymers.

As used herein, "pesticide" refers to a chemical or biological active compounds intended to kill or control pests and/or weeds, or modify the behavior and/or physiology of pests and/or weeds. Pesticide includes, but are not limited to, herbicide, insecticide, nematicide, molluscicide, piscicide, avicide, rodenticide, bactericide, fungicide, antimicrobial agent, insect repellents, insect synergists, herbicide safeners, and germination inhibitors. Pesticides useful in specific embodiments disclosed herein include, but are not limited to bifenthrin, chlorethoxfos, and Proxel GXL.

As used herein, "biological pesticide" refers to pesticides which comprise living organisms such as, but not limited to, fungi, nematodes, and microbes. Biological pesticides can be classified as microbial pesticides, bio-derived chemicals, plant-incorporated protectants, and RNAi pesticides. Microbial pesticides include, but are not limited to bacteria, entomopathogenic fungi or viruses, and entomopathogenic nematodes. Bio-derived chemicals are naturally occurring substances which can be chemically synthesized, and can include, but are not limited to, essential oils, neem oil, rotenone, and pyrethrum.

As used herein, "herbicide" refers to compounds or substrates used to control unwanted plant growth, and are also known as weedkillers. Herbicides can be selective or non-selective. Selective herbicides control specific plant species, while leaving the desired crop relatively unharmed, whereas non-selective herbicides are used to clear all plants.

As used herein, "biocide" refers to compounds or substrates used for controlling, deterring, rendering harmless, or destroying harmful organisms. Biocides can cause damage to natural or manufacture products. Biocides useful in embodiments herein include, but are not limited to Proxel GXL.

As used herein, "plant growth regulator" refers to compounds or substrates used to modify and alter the growth and/or physiological plant processes. Plant growth regulators are sometimes referred to as plant hormones. Plant growth regulators can control all aspects of growth and development, such as embryogenesis, pathogen defense, stress tolerance, reproductive development, and organ size regulation.

As used herein, "biostimulant" refers to compounds or substrates used to stimulate natural processes of plants to enhance and/or benefit crop quality, nutrient efficiency, nutrient uptake, and tolerance to abiotic stress. Biostimulants include, but are not limited to protein hydrolysates, humic and fulvic acids, seaweed extracts, chitosans, biopolymers, inorganic compounds, and probiotics.

As used herein, "suspension" refers to a heterogenous mixture comprising solid particulates. The particulates may be visible to the naked eye and may eventually settle out of the mixture.

As used herein, "capsule" refers to a structure that encapsulates the active compound(s) such that the active compound(s) is in the interior of the capsule. Capsule types include, but are not limited to polymers, oligosaccharides, and ethoxylates.

As used herein, the term "capsule suspension," or "CS," refers to a stable suspension of an encapsulated agricultural agent in an aqueous continuous phase which is intended for dilution with water before use. The encapsulation is generally provided by polymeric compositions including, without limitation, polyureas, polyurethanes, cyclodextrins, and functionally similar systems.

As used herein, the term "suspension concentrate," or "SC," refers to a stable suspension of an agricultural agent in an aqueous continuous phase which is intended for dilution with water before use. SC preparations generally display non-Newtonian flow characteristics. Suspension concentrate formulations can have any particle size known by one of skill in the art.

As used herein, "emulsion" refers to a mixture comprising at least two liquids that are immiscible, wherein one liquid is dispersed throughout the second liquid.

As used herein, "emulsifier" refers to a compound or substrate which stabilizes an emulsion, a mixture of two or more liquids which are immiscible. In embodiments, an emulsifier can be used to for making an emulsion. Examples of emulsifiers include, but are not limited to monoethanolamine, polyvinyl pyrrolidone polymer, alcohol ethoxylates, castor oil ethoxylates, and the like.

As used herein, "emulsifying" refers to a process of making an emulsion. The emulsifying process may or may not contain emulsifiers.

As used herein, the term "suspo-emulsion," or "SE," refers to a stable suspension of fine particles combined with an emulsion of fine droplets of an oil in an aqueous continuous phase.

As used herein, "microemulsion" or "ME" refers to a mixture of water, water insoluble and water-soluble compounds which form a visually transparent, homogenous liquid. Active compounds may be in the aqueous phase, the non-aqueous phase, or both. Microemulsion formulations can be prepared such that the aqueous phase is considered the dispersed phase, the continuous phase, or alternatively, wherein the two phases are considered to be bicontinuous. Microemulsion formulations will disperse in water forming conventional emulsions or dilute microemulsions.

As used herein, "emulsion concentrate," or "emulsifiable concentrate" refers to a stable emulsion or microemulsion comprising active compound(s) in either the aqueous phase, non-aqueous phase, or both, designed for dilution with water before use. Emulsions are metastable systems, and therefore, after transportation may be necessary to re-homogenize the formulation by shaking or stirring.

As used herein, the term "oil dispersion," or "oil-based suspension concentrate," or "OD," refers to a stable suspension of an agricultural active ingredient in an organic solvent fluid (and may contain other dissolved compounds) which is intended for dilution with water before use.

As used herein, "alkyl formaldehyde condensate" refers to a group of polymeric surfactants prepared by the condensation reaction of alkylaryl compounds such as t-butyl or nonylphenol with formaldehyde to yield a methylene bridged condensation product. The resulting polymer is further functionalized through ring-opening polymerization of epoxides on the multitude of hydroxyl sites to yield complex non-ionic surfactants. The properties of these polyalkylene oxide alkylaryl (such as t-butylphenol) formaldehyde condensates can be engineered from being highly water soluble to oil soluble through selection of the type of alkylaryl material, the alkylene oxide(s), the amount and sequence of incorporation.

As used herein, "alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Alkyl groups can be substituted or unsubstituted.

As used herein, "alkoxy" refers to an alkyl group having an oxygen atom that connects the alkyl group to the point of attachment: alkyl-O—. As for alkyl group, alkoxy groups can have any suitable number of carbon atoms, such as $C_{1-6}$. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. Alkoxy groups can be substituted or unsubstituted.

As used herein, "alkoxylation" refers to the process of adding alkoxy groups to a compound or substrate.

As used herein, "haloalkyl" refers to alkyl, as defined above, where some or all of the hydrogen atoms are replaced with halogen atoms. As for alkyl group, haloalkyl groups can have any suitable number of carbon atoms, such as $C_{1-6}$. For example, haloalkyl includes trifluoromethyl, fluoromethyl, etc. In embodiments, the term "perfluoro" can be used to define a compound or radical where all the hydrogens are replaced with fluorine. For example, perfluoromethyl refers to 1,1,1-trifluoromethyl.

As used herein, "ethoxylate" refers to classes of compound which comprise covalently linked ethylene oxide functional groups on the compound or substrate.

As used herein, "ethoxylation" refers to a chemical process wherein ethylene oxide is added to a compound or substrate.

As used herein, "alkyl ethoxylate" refers to alkyl compounds which comprise ethylene oxide functional groups.

As used herein, "polyurea" refers to a type of polymer derived from reacting a diisocyanate compound with a polyamine. Polyureas have a chemical moiety with the following formula:

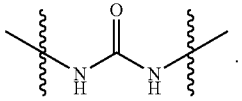 [SMILES: *NC(=O)N*]

As used herein, "polyisocyanate" refers to a type of polymer comprising more than one isocyanate group.

As used herein, "polyamine" refers to a polymer or compound comprising more than one amino group.

As used herein, "polyamide" refers to a polymer comprising more than one amide bond.

As used herein, "polyurethane" refers to a polymer comprising carbamate linkers with the following formula:

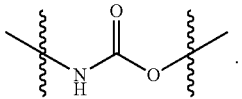 [SMILES: *NC(=O)O*]

As used herein, "polycarbonate" refers to a polymer comprising more than one carbonate group.

As used herein, "polysulfonamide" refers to a polymer comprising more than one sulfonamide group.

As used herein, "polyimine" refers to a polymer comprising more than one imine group.

As used herein, "lignosulfonate" refers to water-soluble anionic polymers, which are also polyelectrolytes. Lignosulfonates are also referred to as sulfonated lignins.

As used herein, "polyvinyl alcohol" refers to a polymer which is water-soluble and comprises the formula —[CH$_2$CH(OH)]$_n$—. Polyvinyl alcohol is traditionally prepared by hydrolysis of polyvinylacetate and has emulsifying properties.

As used herein, "acrylic polymers" refers to polymers which are elastic, resistant to breaking, and transparent. Monomers comprising a vinyl group and carboxylic acid ester terminus or nitrile are traditionally used to form acrylic polymers. Examples of monomers useful in forming acrylic polymers include, but are not limited to, methyl acrylate, methacrylates, ethyl acrylate, 2-chloroethyl vinyl ether, 2-ethylhexyl acrylate, hydroxyethyl methacrylate, butyl acrylate, butyl methacrylate, and trimethylolpropane triacrylate (TMPTA). Acrylic polymers include, but are not limited to, Envi-Pol 871, PAPI 27 Polymeric MDI, polymethyl methacrylate, polyacrylates, polyacrylate salts such as sodium polyacrylate, poly(vinyl acetate) (PVAc), and polyacrylamide.

As used herein, "acrylic copolymers" refers to acrylic polymers comprising more than one type of monomer.

As used herein, "rheology modifier" refers to a compound or substrate which can modify the viscosity and or flow of a liquid. Types of rheology modifiers include, but are not limited to, Kelzan S Plus, polysaccharides, xanthan gums, guar gums, locust gums, clays, silicas, starches, rheo-surfactants and mixtures thereof.

As used herein, "polysaccharide" refers to a compound comprising multiple monosaccharides covalently linked together by glycosidic linkages. Polysaccharides can be highly branched or linear. If all the monosaccharides are the same type, the polysaccharide can be referred to as a homopolysaccharide. When more than one type of monosaccharide is present, the polysaccharide is referred to as a heteropolysaccharide. Traditionally, polysaccharides refer to about more than 10 monosaccharide units, and the term "oligosaccharide" is used to refer to about 3 to 10 monosaccharide units, although the precise cutoff can vary.

As used herein, "cyclodextrin" refers to cyclic oligosaccharides comprising glucose subunits forming a macrocyclic ring joined by alpha-1,4-glycosidic bonds. Alpha-cyclodextrin comprises 6 glucose subunits, beta-cyclodextrin comprises 7 glucose subunits, and gamma-cyclodextrin comprises 8 glucose subunits.

As used herein, "guar gum" refers to a polysaccharide comprising galactomannan. Guar gum can be extracted from guar beans and can have liquid-thickening properties.

As used herein, "locust gum" also known as locust bean gum, consisting essentially of polysaccharides composed of galactomannan.

As used herein, "clay" refers to finely-grained soil or rock material comprising silicate minerals. Clay may comprise trace amounts of quartz and metal oxides such as aluminium oxide and magnesium oxide. When mixed in certain proportions with water, clay exhibits plasticity=.

As used herein, "silica" refers to silicon dioxide with the chemical formula $SiO_2$.

As used herein, "starch" refers to a carbohydrate polymer comprising glucose monosaccharides covalently linked by glycosidic bonds. Starch can be used as a gluing agent, a stiffening agent, and/or a thickening agent.

As used herein, "rheo-surfactant" refers to surfactants which can modify the rheology of a solution, also known as associative thickeners. Such agents include hydrophobically modified hydroxyethyl cellulose, hydrophobically modified alkali swellable emulsion polymers (RASE), hydrophobically-modified ethoxylated urethane polymer (FLEUR), and polyalkylene oxide polymers.

As used herein, "antifoaming agent" refers to a compound or substrate which removes, reduces, and/or hinders the formation of foam in liquid processing. Antifoaming agents include, but are not limited to, Xiameter, polydimethylsiloxanes, silcones, alcohols, sterates, glycols, and oils.

The term "crosslinked", as described herein, refers to the state of having numerous covalent bonds to each other such that they become a single structure. The chemical functionality that links the individual solid phase supports that are crosslinked, is termed a "crosslinking agent". A crosslinking agent is typically a bifunctional compound that reacts with one reactive functional group on one compound or substrate and one reactive functional group on another compound or substrate, thereby linking the two compounds or substrates to each other.

As used herein, "aqueous mixture" refers to a liquid solution or mixture wherein the solvent is water. The aqueous mixture may contain salts and other organic solvents such that the liquid solution comprises a majority of water.

As used herein, "organic mixture" refers to a liquid solution or mixture wherein the solvent is an organic solvent. Organic solvents refer to water-miscible water-miscible or water-immiscible solvents capable of dissolving either or both of water-soluble and water-insoluble organic compounds. Organic solvents useful in embodiments herein include, but are not limited to, aromatic 200ND, monoethanolamine, benzene, toluene, xylene, 3-amino-1-propanol, diethylenetriamine (DETA), propylene glycol, and alcohols. Examples of alcohols useful in embodiments herein include, but are not limited to, methanol, ethanol, propanol, and isopropanol. One of skill in the art will appreciate that other organic solvents are useful in embodiments herein.

II. EMBODIMENTS

P1. In embodiments, there are provided suspensions comprising a pesticide in particulate form, a polymeric dispersant, and a microfibrillated cellulose.

P2. In embodiments, the suspension has a viscosity from about 2,000 mPa·s to about 25,000 mPa·s at 25° C. at a shear rate of 0.1 to 0.2 reciprocal seconds.

P3. In embodiments, the solid form has a median particle size in a range from about 1 micron to about 15 microns.

P4. In embodiments, the particulate is a solid pesticide.

P5. In embodiments, the particulate is a capsule.

P6. In embodiments, the capsule is formed by encapsulation of the pesticide in a wall selected from the group consisting of a cyclodextrin, alkyl ethoxylates having linear chains of 20 to 50 carbons and 20 to 90 percent ethoxylation, a polyurea, a polyurethane, a polycarbonate, a polyamide, and a polysulfonamide, any of which is optionally cross-linked and combinations thereof.

P7. In embodiments, the capsule is a crosslinked polyurea derived from a polyisocyanate and a crosslinking agent.

P8. In embodiments, the polyisocyanate is selected from poly(phenyl isocyanate)-co-formaldehyde, tetramethylene diisocyanate, pentamethylene diisocyanate, hexamethylene diisocyanate, toluene diisocyanate, diphenylmethene-4,4'-diisocyanate, polymethylene polyphenylene isocyanate, 2,4,4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate and 4,4'4"-triphenylmethane triisocyanate.

P9. In embodiments, the crosslinking agent comprises a polyamine.

P10. In embodiments, the polyamine is selected from diethylenetriamine, ethylenediamine, propylene-1,3-diamine, tetramethylenediamine, pentamethylenediamine, 1,6-hexamethylenediamine, diethylenetriamine, triethylenetetramine, tetraethylenepentamine, pentaethylenehexamine, 4,9-dioxadodecane-1,12-diamine, 1,3-phenylenediamine, 2,4- and 2,6-toluenediamine and 4,4'-diaminodiphenylmethane or acid addition salt thereof.

P11. In embodiments, the polyisocyanate is poly(phenyl isocyanate)-co-formaldehyde.

P12. In embodiments, the polyamine is diethylenetriamine.

P13. In embodiments, the pesticide is selected from the group consisting of herbicides, fungicides, insecticides, nematicides, plant growth regulators, biostimulants, biological pesticides.

P14. In embodiments, the pesticide comprises one or more insecticides.

P15. In embodiments, the pesticide is a combination of chlorethoxyfos and bifenthrin.

P16. In embodiments, the pesticide is present in amount from about 0.1% to about 60% by weight of the suspension.

P17. In embodiments, the polymeric dispersant is selected from the group consisting of anionic polymeric dispersants, lignosulfonates, alkyl formaldehyde condensates, non-ionic polymeric dispersants, polyvinyl alcohols, acrylic copolymers, acrylic comb dispersant.

P18. In embodiments, the polymeric dispersant is an acrylic comb polymeric dispersant.

P19. In embodiments, the polymeric dispersant is Envi-Pol 871.

P20. In embodiments, the microfibrillated cellulose is present in an amount from about 0.05% to about 3% by weight of the suspension.

P21. In embodiments, the microfibrillated cellulose is Exilva F-01V.

P22. In embodiments, suspensions may further comprise ethanolamine.

P23. In embodiments, suspensions may further comprise a solvent selected from water, aromatic solvents, a glycol, methyl oleate, aliphatic solvents, and mixtures thereof.

P24. In embodiments, suspensions may further comprise of a biocide.

P25. In embodiments, the biocide is selected from the group consisting of isothiazolinone, formaldehyde, butylated hydroxytoluene.

P26. In embodiments, the biocide is an isothiazolinone.

P27. In embodiments, the isothiazolinone is benzisothiazolinone.

P28. In embodiments, the biocide is present in and amount from about 0.005% to about 3% by weight of the suspension.

P29. In embodiments, suspensions may further comprise an antifoaming agent.

P30. In embodiments, the antifoaming agent is a silicone antifoam.

P31. In embodiments, the antifoaming agent is a silicone emulsion.

P32. In embodiments, the antifoaming agent is present in an amount from about 0.01% to about 2% by weight of the suspension.

P33. In embodiments, suspensions may further comprise a rheology modifier.

P34. In embodiments, the rheology modifier is selected from the group consisting of polysaccharides, guar gums, locust gums, clays, silicas, starches, rheo-surfactants, microfibrillated cellulose and combinations thereof.

P35. In embodiments, the rheology modifier is a microfibrillated cellulose.

P36. In embodiments, the microfibrillated cellulose is Exilva F01V.

P37. In embodiments, the rheology modifier further comprises a polysaccharide.

P38. In embodiments, the polysaccharide is selected from the group consisting of xanthan gum, guar gum, locust gum.

P39. In embodiments, the rheology modifier is present in an amount from about 0.01 to about 5% by weight of the suspension.

P40. In embodiments, there are provided encapsulation suspension comprising: an encapsulated pesticide in particulate form, a polymeric dispersant, and a microfibrillated cellulose.

P41. In embodiments, the encapsulated pesticide comprises a mixture of chlorethoxyfos and bifenthrin encapsulated in a polyurea.

P42. In embodiments, there are provided methods of making an encapsulated suspension comprising providing an aqueous mixture comprising polymeric dispersant in water, adding to the aqueous mixture an organic mixture comprising a pesticide and polyisocyanate in an organic solvent, emulsifying the organic mixture in the aqueous mixture to a desired particle size emulsion, adding a crosslinking agent to the emulsion to provide an encapsulated pesticide and adding at least one rheology modifier comprising microfibrillated cellulose to the encapsulated pesticide to form a suspension.

P43. In embodiments, the rheology modifier consists of microfibrillated cellulose.

P44. In embodiments, the rheology modifier further comprises xanthan gum.

P45. In embodiments, the pesticide comprises a mixture of chlorethoxyfos and bifenthrin.

P46. In embodiments, chlorethoxyfos is present at about 25 weight percent of the suspension.

P47. In embodiments, bifenthrin is preset at about 4 weight percent of the suspension.

P48. In embodiments, methods may further comprise adding an emulsifier to the encapsulated pesticide.

P49. In embodiments, the emulsifier is monoethanolamine.

III. FURTHER EMBODIMENTS

A. Compositions and Formulations

In embodiments, there are provided compositions comprising a capsule suspension (CS) of a mixture of chlorethoxyfos and bifenthrin in a liquid phase, the mixture being disposed within an encapsulating wall, the composition further comprising a polymeric dispersant, microfibrillated cellulose, and optionally ethanolamine.

In embodiments, the encapsulating wall comprises a polyurea.

In embodiments, the liquid phase comprises water.

In embodiments, compositions may further comprise ethanolamine.

In embodiments, there are provided compositions comprising an agricultural agent in particulate form and a microfibrillated cellulose, wherein the particulate form is selected from the group consisting of a liquid droplet, a gel, or a combination thereof, and wherein the agricultural agent in particulate form are part of an emulsifiable concentrate (EC), a capsule suspension (CS), a suspo-emulsion (SE), a microemulsion (ME), or an oil dispersion (OD). The compositions may comprise additionally a suspension concentrate (SC) combined with one or more of the EC, CS, SE, ME, or OD forms.

In embodiments, the composition may further comprise solid particulates, amorphous state particulates, or combinations thereof. Solid particulate may be crystalline, semi-crystalline. Solid particulates may include wettable powders (WP), water dispersible powders for slurry seed treatment (WS), water dispersible granules (WG), emulsifiable granules (EG), and emulsifiable powders (EP). Solid particulate may be also be part of a separate formulation that is a suspension concentrate (SC) that is added to the composition.

In embodiments, compositions may further comprise a polymeric dispersant.

In embodiments, the microfibrillated cellulose may be pre-processed with a wetting agent or dispersant and subjected to shear conditions. This additional pre-treatment may be used to increase the loss modulus (G') or storage modulus (G") when forming the compositions herein.

In embodiments, the agricultural agent comprises one or more of a pesticide, a biological pesticide, an herbicide, an insecticide, a plant growth regulator, a biostimulant, a UV-protectant, a dust repellant, a hormone, a fertilizer, a micronutrient or combinations thereof.

In embodiments, the solid particulate, metamict state particulates, or combinations thereof comprises one or more of a pesticide, a biological pesticide, an herbicide, an insecticide, a plant growth regulator, a biostimulant, a UV-protectant, a dust repellant, a hormone, a fertilizer, a micronutrient or combinations thereof.

In embodiments, the agricultural agent comprises chlorethoxyfos.

In embodiments, the agricultural agent comprises bifenthrin.

In embodiments, the agricultural agent is present in an amount from about 0.1% to about 60% by weight of the composition.

In embodiments, microfibrillated cellulose is present in an amount from about 0.01% to about 5% by dry weight of the composition.

In embodiments compositions may further comprise a polymeric dispersant is selected from the group consisting of anionic polymeric dispersants, lignosulfonates, alkyl formaldehyde condensates, non-ionic polymeric dispersants, polyvinyl alcohols, acrylic copolymers, and acrylic comb dispersant.

In embodiments, the agricultural agent is part of a capsule suspension, the polymeric dispersant is an acrylic comb polymeric dispersant.

In embodiments, the polymeric dispersant is an anionic acrylic polymer.

In embodiments, compositions may further comprise an additional rheology modifier.

In embodiments, the rheology modifier is selected from the group consisting of polysaccharides, xanthan gums, guar gums, locust gums, clays, silicas, starches, rheo-surfactants, and mixtures thereof.

In embodiments, the rheology modifier is present in an amount from about 0.01% to about 5% by weight of the suspension.

In embodiments, compositions may further comprise ethanolamine.

In embodiments, there are provided compositions comprising: an agricultural agent in particulate form and a microfibrillated cellulose.

In embodiments, there are provided compositions comprising: an agricultural agent in a capsule suspension and a microfibrillated cellulose.

In embodiments, there are provided compositions comprising: an agricultural agent in a suspension concentrate and a microfibrillated cellulose.

In embodiments, there are provided composition comprising: an agricultural agent in a microemulsion and a microfibrillated cellulose.

In embodiments, there are provided compositions comprising: an agricultural agent in a suspo-emulsion and a microfibrillated cellulose.

In embodiments, there are provided compositions comprising: an agricultural agent in an emulsifiable concentrate and a microfibrillated cellulose.

In embodiments, there are provided compositions comprising: an agricultural agent in a wettable granule and a microfibrillated cellulose.

In embodiments, there are provided compositions comprising: an agricultural agent in an oil-dispersion and a microfibrillated cellulose.

Agricultural agents useful in embodiments herein includes any suitable agricultural agent known by one of skill in the art. In embodiments, the agricultural agent comprises one or more of a pesticide, a biological pesticide, an herbicide, a plant growth regulator, and a biostimulant.

Pesticides useful in embodiments herein includes any suitable pesticide known by one of skill in the art. In embodiments, the pesticide is an herbicide, insecticide, nematicide, molluscicide, piscicide, avicide, rodenticide, bactericide, fungicide, antimicrobial agent, insect repellents, insect synergists, herbicide safeners, or germination inhibitors. In embodiments, the pesticide comprises chlorethoxyfos, bifenthrin, Proxel GXL, or a combination thereof. In embodiments, the pesticide comprises chlorethoxyfos. In embodiments, the pesticide comprises bifenthrin.

Herbicides useful in embodiments herein includes any suitable herbicide known by one of skill in the art. In embodiments the herbicide is Roundup renew, Watkins Weedkiller, McGregor's Weedout, Agpro Glyphosate 360, Dow Glyphosate 360, Glyphosate 360, Gro-Chem Glyphosate 360, Hortcare Glyphosate 360 SC, Jolyn G 360, Nufarm Glyphosate 360, Nufarm Glyphosate Gold, Samurai™, Orion Glyphosate 360, Proactive Glyphosate 360, Proactive Glyphosate Green, Rainbow & Brown Glyphosate, Associate 600, Escort, Meturon, Mustang, Brush Off, Grazon, Scrubcutter, Victory™, Renovate, Renovate Gorsekiller, Versatil, Multiple, Tango™, Void™, Pasture-Kleen™, Relay™, Thistle Killem LV™, Hard to Kill Weedkiller, Amitrole 400, Chemagro Amitrole 40AC, Yates Amitrole, or a combination thereof. In embodiments the herbicide comprises glyphosate, metsulferon-methyl, triclopyr, clopyralid, amitrole, aminopyralid, atrazine, dicamba, glufosinate ammonium, fluroxypyr, imazapyr, imazapic, linuron, sodium chlorate, picloram, paraquat, pendimethalin, metolachlor, acetic acid, D-limonene, 2,4-dichlorophenoxyacetic acid and derivatives, 2-methy-4-chlorophenoxyacetic acid and derivatives, or a combination thereof.

Plant growth regulators useful in embodiments herein includes any suitable plant growth regulator known by one of skill in the art. In embodiments, the plant growth regulator comprises auxins, cytokinins, ethylene, ethylene releasers, gibberellins, inhibitors or retardants. In embodiments, the plant growth regulator comprises 2,4-dichlorophenoxyacetic acid, indolebutanoic acid, 3-indoleacetaldehyde acid, 3-indoleacetic acid, 3-indolepyruvic acid, kinetin, CPPU, ethylene, Ethephon, $GA_4GA_7$, $GA_3$, abscisic acid, ancymidol, carbaryl, chlormequat, ChlorIPC, hydrogen cyanamide, succinic acid, daminozide, flurprimidol, mefluidide, mepiquat chloride, paclobutrozol, prohexadione calcium, or a combination thereof.

Biostimulants useful in embodiments herein includes any suitable biostimulant known by one of skill in the art. In embodiments, the biostimulant comprises protein hydrolysates, humic acid, fulvic acids, seaweed extracts, chitosans, biopolymers, inorganic compounds, and probiotics or a combination thereof.

In embodiments, the compositions may comprise at least one of fertilizer, pesticide, fungicide, insecticide, herbicide, growth regulator, safener, and micronutrient.

In embodiments, composition may comprise a fertilizer, wherein the fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-40: 0-50: 0-40, with the proviso that at least one of the value of the nitrogen source, the phosphorus, and the potassium source is not zero.

In embodiments, the nitrogen source is selected from the group consisting of ammonia, urea, urea phosphate, thiourea, ammonium sulfate, ammonium nitrate, potassium nitrate, ammonium phosphate, ammonium polyphosphate, ammonium chloride, diammonium phosphate (DAP), urea triazone, amino acids, aromatic nitrogen or heterocyclic nitrogen compounds, hexamethylene tetraamine, melamine, nitrobenzene, and mixtures thereof.

In embodiments, the phosphorous source is selected from the group consisting of phosphate salts, phosphite salts, calcium phosphate, nitro phosphate, potassium phosphate, mono ammonium phosphate, di-ammonium phosphate, triple super phosphate, phosphoric acid, phosphorous acid, polyphosphoric acid, HEDP (1-hydroxyethane 1,1-diphosphonic acid), AMP (Adenosine monophosphate), amino-tris (methylenephosphonic acid), phosphorous pentoxide, and mixtures thereof.

In embodiments, the potassium source is selected from the group consisting of potassium sulfate, potassium phosphate, potassium oxide, potassium hydroxide, potassium chloride, potassium nitrate, potassium carbonate, potassium bicarbonate, potassium magnesium sulfate, and mixtures thereof.

In embodiments, the composition may comprise a herbicide selected from the group consisting of glyphosate, glufosinate, thiocarbamates, difenzoquat, pyridazinone, nicotinanilide, fluridone, isoxazolidinone, diphenylether; N-phenylphthalimide, oxadiazole, triazolinone, chloroacetamides, oxyacetamide, phthalamate, N-phenylphthalimide, oxadiazole, triazolinone, acetamides, benzoylisoxazol, isoxazole, pyrazole, pyrazolium, triketone, benzofuran, acetochlor, clethodim, dicamba, flumioxazin, fomesafen, metolachlor, triasulfuron, mesotrione, quizalofop, saflufenacil, sulcotrione, 2,4-dichlorophenoxyacetic, salts thereof, and mixtures thereof.

In embodiments, the composition may comprise a micronutrient comprises an element selected from the group consisting of boron, copper, manganese, iron, chlorine, molybdenum, zinc, and mixtures thereof.

In embodiments, compositions may comprise at least one of glyphosate, glufosinate, and a fertilizer comprises at least one of a nitrogen source, a phosphorus source, and a potassium source, wherein the nitrogen source, the phosphorus source, and the potassium source are present in amounts to provide a NPK (nitrogen-phosphorus-potassium)

value of between 0-40: 0-50: 0-40, with the proviso that at least one of the value of the nitrogen source, the phosphorus, and the potassium source is not zero.

In embodiments, the nitrogen source is selected from the group comprising but not limited to ammonia, urea, urea phosphate, thiourea, ammonium sulfate, ammonium nitrate, potassium nitrate, ammonium phosphate, ammonium polyphosphate, ammonium chloride, diammonium phosphate (DAP), urea triazone, amino acids, aromatic nitrogen or heterocyclic nitrogen compounds, hexamethylene tetraamine, melamine, nitrobenzene, and mixtures thereof.

In embodiments, the phosphorous source is selected from the group comprising but not limited to phosphate salts, phosphite salts, calcium phosphate, nitro phosphate, potassium phosphate, mono ammonium phosphate, di-ammonium phosphate, triple super phosphate, phosphoric acid, phosphorous acid, polyphosphoric acid, HEDP (1-hydroxyethane 1,1-diphosphonic acid), AMP (Adenosine monophosphate), amino-tris(methylenephosphonic acid), phosphorous pentoxide, and mixtures thereof.

In embodiments, the potassium source is selected from the group comprising but not limited to potassium sulfate, potassium phosphate, potassium oxide, potassium hydroxide, potassium chloride, potassium nitrate, potassium carbonate, potassium bicarbonate, potassium magnesium sulfate, and mixtures thereof.

In embodiments, the medium having a high ionic strength comprises an agriculturally active ingredient as a salt.
In embodiments, the agriculturally active ingredient as a salt is selected from the group consisting of glufosinate, glyphosate, 2,4 D, dicamba, or other ionic active ingredients.

In embodiments, the agriculturally active ingredient is present. In embodiments, the agriculturally active ingredient is in a particulate form. In embodiments, the particulate is a solid particle of the agriculturally active ingredient. In embodiments, the particulate is a capsule suspension of the agriculturally active ingredient. In embodiments, the particulate is a suspension concentrate of the agriculturally active ingredient. In embodiments, the particulate is an emulsifiable concentrate of the agriculturally active ingredient. In embodiments, the particulate is a liquid particle of the agriculturally active ingredient. In embodiments, the particulate is a dispersed gel of the agriculturally active ingredient.

In embodiments, the agriculturally active ingredient comprises at least one of a virucide, a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, a piscicide, an avicide, a rodenticide, an antifeedant, a chemosterilant, and a micronutrient. In embodiments, the agriculturally active ingredient comprises at least one of a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, and a micronutrient. In embodiments, the agriculturally active ingredient comprises a virucide. In embodiments, the agriculturally active ingredient comprises a pesticide. In embodiments, the agriculturally active ingredient comprises a bactericide. In embodiments, the agriculturally active ingredient comprises an algaecide. In embodiments, the agriculturally active ingredient comprises a nematicide. In embodiments, the agriculturally active ingredient comprises a fungicide. In embodiments, the agriculturally active ingredient comprises a larvicide. In embodiments, the agriculturally active ingredient comprises an insecticide. In embodiments, the agriculturally active ingredient comprises an herbicide. In embodiments, the agriculturally active ingredient comprises an herbicide safener. In embodiments, the agriculturally active ingredient comprises a plant growth regulator. In embodiments, the agriculturally active ingredient comprises a plant activator. In embodiments, the agriculturally active ingredient comprises a synergist. In embodiments, the agriculturally active ingredient comprises an acaricide. In embodiments, the agriculturally active ingredient comprises a molluscicide. In embodiments, the agriculturally active ingredient comprises a repellant. In embodiments, the agriculturally active ingredient comprises a piscicide. In embodiments, the agriculturally active ingredient comprises an avicide. In embodiments, the agriculturally active ingredient comprises a rodenticide. In embodiments, the agriculturally active ingredient comprises an antifeedant. In embodiments, the agriculturally active ingredient comprises a chemosterilant. In embodiments, the agriculturally active ingredient comprises a micronutrient.

In embodiments, the virucide is imanin or ribavirin.

In embodiments, the bactericide is bronopol, copper hydroxide, cresol, dichlorophen, dipyrithione, dodicin, fenaminosulf, formaldehyde, hydrargaphen, 8-hydroxyquinoline sulfate, kasugamycin, nitrapyrin, octhilinone, oxolinic acid, oxytetracycline, probenazole, streptomycin, tecloftalam, or thiomersal.

In embodiments, the nematicide is an antibiotic nematicide (e.g., abamectin (AVID®), a carbamate nematicide (e.g., benomyl, carbofuran, carbosulfan, cloethocarb, oxime carbamate nematicides, alanycarb, aldicarb, aldoxycarb, or oxamyl), an organophosphorus nematicide (e.g., diamidafos, fenamiphos, fosthietan, phosphamidon, cadusafos, chlorpyrifos, dichlofenthion, dimethoate, ethoprophos, fensulfothion, fosthiazate, heterophos, isamidofos, isazofos, mecarphon, phorate, phosphocarb, terbufos, thionazin, or triazophos), acetoprole, benclothiaz, chloropicrin, dazomet, 1,2-dibromo-3-chloropropane (DBCP), dichlorophenolindophenol (DCIP), 1,2-dichloropropane, 1,3-dichloropropene, furfural, iodomethane, metam, methyl bromide, methyl isothiocyanate, or xylenols.

In embodiments, the algaecide is a bromine compound (e.g., AGRIBROM®), bethoxazin (3-benzo[b]thien-2-yl-5,6-dihydro-1,4,2-oxathiazine 4-oxide), copper sulfate, cybutryne (N-cyclopropyl-N-(1,1-dimethylethyl)-6-(methylthio)-1,3,5-triazine-2,4-diamine), dichlon (2,3-dichloro-1,4-naphthoquinone), dichlorophen (2,2-methylenebis[4-chlorophenol] or 4,4-dichloro-2,2-methylenediphenol), endothal, fentin (triphenyltin, triphenylstannylium, or fenolovo), hydrated lime (calcium hydroxide), nabam, quinoclamine (2-amino-3-chloro-1,4-naphthoquinone or ACN), quinonamid (2,2-dichloro-N-(3-chloro-1,4-naphthoquinon-2-yl)acetamide), or simazine.

In embodiments, the fungicide is an aliphatic nitrogen fungicide (e.g., butylamine, cymoxanil, dodicin, dodine, guazatine, or iminoctadine), an amide fungicide (e.g., carpropamid, chloraniformethan, cyazofamid, cyflufenamid, diclocymet, ethaboxam, fenoxanil, flumetover, furametpyr, penthiopyrad, prochloraz, quinazamid, silthiofam, triforine, benalaxyl (e.g., benalaxyl-M), furalaxyl, metalaxyl (RIDOMIL®, SUBDUE®) (e.g., metalaxyl-M), pefurazoate, benzamide fungicides (e.g., benzohydroxamic acid, fluopicolide, tioxymid, trichlamide, zarilamid, or zoxamide), furamide fungicides (e.g., cyclafuramid, furmecyclox), phenylsulfamide fungicides (e.g., dichlofluanid, tolylfluanid), valinamide fungicides (e.g., benthiavalicarb, iprovalicarb), anilide fungicides (e.g., benalaxyl (e.g., benalaxyl-M), boscalid, carboxin (VITAVAX®), fenhexamid, metalaxyl (e.g., metalaxyl-M), metsulfovax, ofurace, oxadixyl, oxycarboxin, pyracarbolid, thifluzamide, or tiadinil), benzanilide fungicides (e.g., benodanil, flutolanil, mebenil, mepronil, salicylanilide, or tecloftalam), furanilide fungicides (e.g., fenfuram, furalaxyl, furcarbanil, or methfuroxam), or sulfonanilide fungicides (e.g., flusulfamide)), an antibiotic fungicide (e.g., aureofungin, blasticidin-S, cycloheximide, griseofulvin, kasugamycin, natamycin, polyoxins, polyoxorim, streptomycin, validamycin, or strobilurin fungicides (e.g., azoxystrobin, dimoxystrobin, fluoxastrobin, kresoxim-methyl, metominostrobin, orysastrobin, picoxystrobin, pyraclostrobin, or trifloxystrobin)), an aromatic fungicide (e.g., biphenyl, chlorodinitronaphthalene, chloroneb, chlorothalonil (BRAVO®, DACONIL 2787®, EXOTHERM®, TERMIL®), cresol, dicloran, chlorobenzoles (e.g., hexachlorobenzene (HCB), pentachloronitrobenzene (PCNB) (TERRACLOR®)), pentachlorophenol (penta) (PCP) (DUROTOX®), quintozene, sodium pentachlorophenoxide, tecnazene, or tribromophenol), a benzimidazole fungicide (e.g., benomyl, carbendazim, chlorfenazole, cypendazole, debacarb, fuberidazole, mecarbinzid, rabenzazole, or thiabendazole), a benzimidazole precursor fungicide (e.g., furophanate, thiophanate, or thiophanate-methyl), a benzothioazole fungicide (e.g., bentaluron, chlobenthiazone, or (benzothiazol-2-ylthio)methyl thiocyanate (TCMTB)), a bridged diphenyl fungicide (e.g., bithionol, dichlorophen, or diphenylamine), a carbamate fungicide (e.g., benthiavalicarb, furophanate, iprovalicarb, propamocarb, thiophanate, thiophanate-methyl (CLEARY 3336®, EASOUT®), benomyl, carbendazim, cypendazole, debacarb, mecarbinzid, or diethofencarb), a conazole fungicide (e.g., climbazole, clotrimazole, imazalil, oxpoconazole, prochloraz, triflumizole, azaconazole, bromuconazole, cyproconazole, diclobutrazol, difenoconazole, diniconazole (e.g., diniconazole-M), epoxiconazole, etaconazole, fenbuconazole, fluquinconazole, flusilazole, flutriafol, furconazole (e.g., furconazole-cis), hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, or uniconazole (e.g., uniconazole-P)), a copper fungicide (e.g., Bordeaux mixture (i.e., copper sulfate/copper(II) tetraoxosulfate/cupric sulfate ($CuSO_4$) (1-2%)+calcium carbonate ($CaCO_3$) or hydroxide with or without stabilizing agents ($CuSO_4 \cdot 3Cu(OH)_2 \cdot 3CaSO_4$)), Burgundy mixture (i.e., disodium carbonate+copper sulfate in water), Cheshunt mixture (i.e., copper(II) tetraoxosulfate and diammonium carbonate), copper acetate, copper carbonate (basic), copper hydroxide, copper naphthenate, copper oleate, copper oxychloride, copper sulfate, copper sulfate (basic), copper zinc chromate, cufraneb, cuprobam, cuprous oxide, mancopper, or oxine copper), a dicarboximide fungicide (e.g., famoxadone, fluoroimide, chlozolinate, dichlozoline, iprodione, isovaledione, myclozolin, procymidone, vinclozolin, captafol (DIFOLATAN®), captan (CAPTAN®), ditalimfos, folpet (FOLPAN®, PHALTAN®, THIOPHAL®), or thiochlorfenphim), a dinitrophenol fungicide/nitroderivative (e.g., binapacryl, dinobuton, dinocap (e.g., dinocap-4 or dinocap-6), dinocton, dinopenton, dinosulfon, dinoterbon, dinitro-ortho-cresol (DNOC), p-nonyl-dinitrophenol, or dinitrophenyl-nonyl-butyrate), a dithiocarbamate fungicide (e.g., dimethyldithiocarbamates (e.g., ferbam or ziram), ethylenebisdithiocarbamates (EBDC) (e.g., mancozeb (DITHANE®), maneb (MB)/manganese ethylene-bis-dithiocarbamate (Mn-EBDC), zineb, nabam/disodium ethylenebis(dithiocarbamate)/disodium 1,2-ethanediylbis(carbamodithioate)), or thiram (THIRAM®, TULISAN®)), propylenebisdithiocarbamates (e.g., propineb), azithiram, carbamorph, cufraneb, cuprobam, disulfiram, metam, tecoram, cyclic dithiocarbamate fungicides (e.g., dazomet, etem, or milneb), or polymeric dithiocarbamate fungicides (e.g., mancopper, metiram, polycarbamate, or propylenebisdithiocarbamates (e.g., propineb))), an imidazole fungicide (e.g., cyazofamid, fenamidone, fenapanil, glyodin, iprodione (CHIPCO26019®, ROVRAL®), isovaledione, pefurazoate, or triazoxide), an inorganic fungicide (e.g., potassium azide, potassium thiocyanate, sodium azide, sulfur fungicides (e.g., sulfur powder (SULPHUR-92%®), wettable sulphur, or lime Sulphur), mercury fungicides (e.g., mercuric chloride, mercuric oxide, mercurous chloride, agrosan GN, ceresan, semesan, perrugen, (3-ethoxypropyl)mercury bromide, ethylmercury acetate, ethylmercury bromide, ethylmercury chloride, ethylmercury 2,3-dihydroxypropyl mercaptide, ethylmercury phosphate, ethylmercury sulfate, N-(ethylmercury)-p-toluenesulphonanilide, hydrargaphen, 2-methoxyethylmercury chloride, methylmercury benzoate, methylmercury dicyandiamide, methylmercury pentachlorophenoxide, 8-phenylmercurioxyquinoline, phenylmercuriurea, phenylmercury acetate, phenylmercury chloride, phenylmercury derivative of pyrocatechol, phenylmercury nitrat, phenylmercury salicylate, thiomersal, or tolylmercury acetate), a morpholine fungicide (e.g., aldimorph, benzamorf, carbamorph, dimethomorph, dodemorph, fenpropimorph, flumorph, or tridemorph), an organophosphorus fungicide (e.g., ampropylfos, ditalimfos, edifenphos, fosetyl, hexylthiofos, iprobenfos, phosdiphen, pyrazophos, tolclofos-methyl, triamiphos, or tri-o-tolyl phosphate/tri-ortho cresyl phosphate (TOCP)), an organotin fungicide (e.g., decafentin, fentin, or tributyltin oxide), an oxathiin fungicide (e.g., carboxin or oxycarboxin), an oxazole fungicide (e.g., chlozolinate, dichlozoline, drazoxolon, famoxadone, hymexazol, metazoxolon, myclozolin, oxadixyl, or vinclozolin), a polysulfide fungicide (e.g., barium polysulfide, calcium polysulfide, potassium polysulfide, or sodium polysulfide), a pyrazole fungicide (e.g., furametpyr or penthiopyrad), a pyridine fungicide (e.g., boscalid, buthiobate, dipyrithione, fluazinam, fluopicolide, pyridinitril, pyrifenox, pyroxychlor, or pyroxyfur), a pyrimidine fungicide (e.g., bupirimate, cyprodinil, diflumetorim, dimethirimol, ethirimol, fenarimol, ferimzone, mepanipyrim, nuarimol, pyrimethanil, or triarimol), a pyrrole fungicide (e.g., fenpiclonil, fludioxonil, or fluoroimide), a quinoline fungicide (e.g., ethoxyquin or halacrinate), an 8-hydroxyquinoline sulfate (e.g., quinacetol or quinoxyfen), a quinone fungicide (e.g., benquinox, chloranil, dichlone, or dithianon), a quinolone, a quinoxaline fungicide (e.g., chinomethionat, chlorquinox, or thioquinox), a thiazole fungicide (e.g., ethaboxam, etridiazole (TRUBAN®), metsulfovax, octhilinone, thiabendazole, thiadifluor, or thifluzamide), a thiocarbamate fungicide (e.g., methasulfocarb or prothiocarb), a thiophene fungicide (e.g., ethaboxam or silthiofam), a triazine fungicide (e.g., anilazine, triazole fungicides, bitertanol, fluotrimazole, or triazbutil), a urea fungicide (e.g., bentaluron, pencycuron, or quinazamid), a systemic fungicide (e.g., oxathin derivatives (e.g., plantvax or vitavax), demosan, or bavistin), acibenzolar, acypetacs, allyl alcohol, benzalkonium chloride, benzamacril, bethoxazin, carvone, chloropicrin, 1,2-dibromo-3-chloropropane (DBCP), dehydroacetic acid, diclomezine, diethyl pyrocarbonate, fenaminosulf (LESAN®), fenitropan, fenpropidin, formaldehyde, furfural, hexachlorobutadiene, iodomethane, isoprothiolane, methyl bromide, methyl isothiocyanate, metrafenone, nitrostyrene, nitrothal-isopropyl, OCH, 2-phenylphenol, phthalide, piperalin, probenazole, proquinazid, pyroquilon, sodium orthophenylphenoxide, spiroxamine, sultropen, thicyofen, tricyclazole, zinc naphthenate, malachite green, or efosite-A1 (ALIETTE®).

In embodiments, the herbicide is copper sulfate ($CuSO_4$), sulfuric acid ($H_2SO_4$), sodium chlorate ($NaClO_3$), ammonium sulfamate ($NH_4SO_3NH_2$), borax, calcium chlorate, ferrous sulfate, potassium azide, potassium cyanate sodium azide, an aliphatic or halo-aliphatic acid (e.g., dalapon/2,2-dichloro propionic acid (DOWPON®, TAFAPON®) or trichloro acetic acid (TCA) (VARITOX®)), an amide herbicide (e.g., allidochlor/N,N-diallyl-2-chloro acetamide (CDAA) (RANDOX®), beflubutamid, benzadox, benzipram, bromobutide, cafenstrole, 2-chloro-N,N-diethylacetamide (CDEA), chlorthiamid, cyprazole, dimethenamid (e.g., dimethenamid-P), diphenamid, epronaz, etnipromid, fentrazamide, flupoxam, fomesafen, halo safen, isocarbamid, isoxaben, napropamide, naptalam/N-1-naphthyohthalamic acid (ALANAP®), penoxsulam, pethoxamid, propyzamide, quinonamid, tebutam, or anilide herbicides (e.g., chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen, propanil/3,4-dichloro propionanilide (STAM F-34®, ROGUE®), benzoylprop, flamprop (e.g., flamprop-M), acetochlor, alachlor/2-chloro-2,6-diethyl-N-(methoxymethyl)-acetanilide (LASSO®), butachlor/N-(butoxymethyl)-2-chloro-2', c' ethyl acetanilide (MACHETE®), butenachlor, delachlor, diethatyl, dimethachlor, metazachlor, metolachlor (e.g., S-metolachlor), pretilachlor, propachlor/2-chloro-N-isopropyl acetanilide (RAMROD®), propisochlor, prynachlor, terbuchlor, thenylchlor, xylachlor, benzofluor, cloransulam, diclosulam, florasulam, flumetsulam, metosulam, perfluidone, profluazol, or pronamide/3,5-dichloro (N-1,1-dimethyl-2-propynyl) benzamide (KERB®))), an acryldehyde (e.g., acrolein/2-propanol or acryl aldihide (AQALIN®)), an aromatic acid herbicide (e.g., benzoic acid herbicides (e.g., chloramben, dicamba, 2,3,6-trichlorobenzoic acid (2,3,6-TBA), or tricamba), pyrimidinyloxybenzoic acid herbicides (e.g., bispyribac or pyriminobac), pyrimidinylthiobenzoic acid herbicides (e.g., pyrithiobac), phthalic acid herbicides (e.g., chlorthal), picolinic acid herbicides (e.g., aminopyralid, clopyralid, or picloram), or quinolinecarboxylic acid herbicides (e.g., quinclorac or quinmerac)), an aniline or nitro-phenol (e.g., dinitamine/2,6-dinitro-3,amino-4-tri-fluoromethyl-N,N-diethyl-aniline (COBEX®), nitralin/4-(methyl-sulphonyl)-2,6-dinitro-N,N-dipropyniline (PLANAVIN®), penexalin/N-(ethyl propyl)-3,4-dimethyl-2,6-dinitrobenzamine (STOMP®), trifluralin/2,6-dinitro-N,N-dipropyl-4-trifluron methylaniline (TREFLAN®), fluchlorlin/N-propyl-N-(2'chloroethyl)-2,6-dintro-trifluroin-ethyl-aniline (BASALIN®), 2-methyl-4,6-dinitrophenol/dinitroorthocresol (DNOC) (SINOX®), dinoseb/4,6-dinitro-2-5-butyl phenol (DOW-WEED KILLER®), pentachlorophenol, nitrofen/2,4-dinitro-4-trifluoro-methyl-diphenyl-ether (TOK E-25®)), an arsenical herbicide (e.g., cacodylic acid, CMA, hexaflurate, MAMA, potassium arsenite, sodium arsenite, disodium methyl arsenate (DSMA) (ANSER 184®), methane arsenic acid (MAA) (ANSAR®), monosodium methyl arsenate (MSMA) (ANSER-529®), calcium arsenate or orthoarsenate/tricalcium arsenate or orthoarsenate ($CaHAsO_4$), lead arsenate ($PbHAsO_4$), or dimethylarsonate), antibiotic herbicides (e.g., bilanafos), benzoic and phenyl acetic acid (e.g., chloramben/3-amino-2,5-dichlorobenzoic acid (AMIBEN, VEGIBEN®), dicamba/2-methoxy-3,6-dichlorobenzoic acid (BANVEL-D®), fenac/2,3,6-trichlorophenyl acetic acid (FENAC®), or oxyfluorfen/2-chloro-1-(3-ethoxy-4-nitro phenoxy)-4-(trifluormethyl) benzene (GOAL®)), a benzoylcyclohexanedione herbicide (e.g., mesotrione or sulcotrione), a benzofuranyl alkylsulfonate herbicide (e.g., benfuresate or ethofumesate), a carbamate herbicide (e.g., carboxazole, chlorprocarb, dichlormate/3,4-dichlorobenzyl methyl carbamate (SIRMATE®), asulam/methyl sulfanilyl carbamate (AUSLOX®), fenasulam, karbutilate, or terbucarb), a carbanilate herbicide (e.g., barban/4-chloro-2-butynyl m-chloro-carbanilate (CARBYNE®), 1-methylpropyl C-(3-chlorophenyl)carbamate (BCPC), carbasulam, carbetamide, 2-chloroethyl N-(3-chlorophenyl)carbamate (CEPC), chlorbufam, chlorprophan/isopropyl m-chloro carbanilate (CIPC®), 2-chloro-1-methylethyl N-(3-chlorophenyl)carbamate (CPPC), desmedipham, phenisopham, phenmedipham, phenmedipham-ethyl, propham/isopropyl carbanilate (IPC®), or SWEP/3,4-dichloro carbonilate (METHYL®)), a cyclohexene oxime herbicide (e.g., alloxydim, butroxydim, clethodim, cloproxydim, cycloxydim, profoxydim, sethoxydim, tepraloxydim, or tralkoxydim), a cyclopropylisoxazole herbicide (e.g., isoxachlortole or isoxaflutole), a dicarboximide herbicide (e.g., benzfendizone, cinidon-ethyl, flumezin, flumiclorac, flumioxazin, or flumipropyn), a dinitroaniline herbicide (e.g., benfluralin, butralin, dinitramine, ethalfluralin, fluchloralin, isopropalin, methalpropalin, nitralin, oryzalin, pendimethalin, prodiamine, profluralin, or trifluralin), a dinitrophenol herbicide (e.g., dinofenate, dinoprop, dinosam, dinoseb, dinoterb, 2-methyl-4,6-dinitrophenol/dinitro-o-cresol (DNOC) (SINOX®), etinofen, or medinoterb), a diphenyl ether herbicide (e.g., ethoxyfen or nitrophenyl ether herbicides (e.g., acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen, or oxyfluorfen)), a dithiocarbamate herbicide (e.g., dazomet or metam), a halogenated aliphatic herbicide (e.g., alorac, chloropon, dalapon, flupropanate, hexachloroacetone, iodomethane, methyl bromide, monochloroacetic acid, SMA, or trichloroacetic acid (TCA)), an imidazolinone herbicide (e.g., imazamethabenz, imazamox, imazapic, imazapyr, imazaquin, or imazethapyr), a nitrile herbicide (e.g., bromobonil, bromoxynil/4-hydroxy-3,5-dibromo benzonitrile (BUCTRIL®), chloroxynil, dichlobenil/2,6-dichlorobenzonitrile (CAS ORON®), iodobonil, ioxynil/4-hydroxy-3-5-di-iodobenzonitrile (ACTRIL®), or pyraclonil), an organophosphorus herbicide (e.g., amiprofos-methyl, anilofos, bensulide, bilanafos, butamifos, 2,4-DEP, O-(2,4-dichlorophenyl) O-methyl (1-methylethyl) phosphoramidothioate (DMPA), ethyl (P,P)-bis(2-ethylhexyl)phosphinate (EBEP), fosamine, phosphonomethyl amino acids/glycine derivatives (e.g., glyphosate/glycine phosphonate (ROUND-UP®) or N-(phosphonomethyl)-glycine/glufosinate), or piperophos)), a phenoxy herbicide (e.g., bromofenoxim, clomeprop, 2,4-DEB, 2,4-DEP/tris(2-(2-4-dichlorophenoxy) ethyl sulfate (FALONE®), 2,4-DES/sodium,2-(2-4-dichlorophenoxy) ethyl sulfate (SESONE®), difenopenten, disul, erbon, etnipromid, fenteracol, trifopsime, 2-(4-chlorophenoxy)acetic acid (4-CPA), 2,4-dichlorophenoxyacetic acid (2,4-D) (ETHYL ESTER®), 3,4-DA, 2-methyl-4-chlorophenoxyacetic acid (MCPA) (ACME MCPA AMINE 4®, AGRITOX®, AGRO ONE®, BORDERMASTER®, BH, MCPA®, CHIPTOX®, DED-WEED®, EMPAL®, KILSEM®, MEPHANAL®, METHOXONE®, PHOMENE®, RHONOX®, AND WEEDAR®), S-ethyl 2-(4-chloro-2-methylphenoxy)ethanethioate (MCPA-thioethyl), or 2,4,5-trichlorophenoxyacetic acid (2,4,5-T) (BRUSH KILLER®) (often contaminated with 2,3,7,8-tetrachlorodibenzo-p-dioxin (TCDD)), Agent Blue, Agent Green, Agent Orange, Agent Pink, Agent Purple, Agent White, dinxol, trinoxol, bromacil, diquat, tandex, monuron, diuron, dalapon, a phenoxybutyric herbicide (e.g., 4-(4-chlorophenoxy)butanoic acid (4-CPB), (2,4-dichloro phenoxy) butyric acid (2,4-DB) (BUTAXONE®), 3,4-DB, 4-chloro-2-methyl-phenoxy) butyric acid (MCPB) (TROPOTOX®), or 4-(2,4,5-trichlorophenoxy)butanoic acid (2,4,5-TB)), an α-phenoxypropionic herbicide (e.g., silvex/2(2,4,5-trichlorophenoxy) propionic acid (WEEDONE®), 2-(4-chlorophenoxy)propanoic acid (4-CPP), dichlorprop/α-(2,4-dichlorophenoxy) propionic acid (2,4-DP®) (e.g., dichlorprop-P), 3,4-DP, fenoprop, or mecoprop/(4-chloro-2-methyl phenoxy) propionic acid (MCPP®) (e.g., mecoprop-P)), an aryloxyphenoxypropionic herbicide (e.g., chlorazifop, clodinafop, clofop, cyhalofop, diclofop, fenoxaprop (e.g., fenoxaprop-P), fenthiaprop, fluazifop (e.g., fluazifop-P), haloxyfop (e.g., haloxyfop-P), isoxapyrifop, metamifop, propaquizafop, quizalofop (e.g., quizalofop-P), or trifop), a phenylenediamine herbicide (e.g., dinitramine or prodiamine), a pyrazolyloxyacetophenone herbicide (e.g., benzofenap or pyrazoxyfen), a pyrazolylphenyl herbicide (e.g., fluazolate or pyraflufen), a pyridazine herbicide (e.g., credazine, pyridafol, pyridate, maleic hydrazide (MH)/1,2-dihydro pyridazine-3,6-dione (RETARD®)), a pyridazinone herbicide (e.g., brompyrazon, chloridazon, dimidazon, flufenpyr, metflurazon, norflurazon, oxapyrazon, or pydanon), a pyridine herbicide (e.g., aminopyralid, cliodinate, clopyralid, dithiopyr, fluroxypyr, haloxydine, picloram/4-amino-3,5,6-trichloro piclonic acid (TORDON®), picolinafen, pyriclor, thiazopyr, or triclopyr), a pyrimidinediamine herbicide (e.g., iprymidam or tioclorim), a quaternary ammonium herbicide (e.g., cyperquat, diethamquat, difenzoquat, morfamquat, diquat/1,1-ethyl-2,2 bipyridylium dibromide (REGLON®), or paraquat/1,1-dimethyl-4,4-bipyridylium dibromide (GRAMOXONE®)), a triazine herbicide (e.g., dipropetryn, triaziflam, trihydroxytriazine, chlorotriazine herbicides (e.g., atrazine/2-chloro-4-(ethyl amino)-6-(isopropyl amino)-S-triazine (ATRATAF®, RESIDOX®), chlorazine, cyanazine, cyprazine, eglinazine, ipazine, mesoprazine, procyazine, proglinazine, propazine, sebuthylazine, simazine/2-chloro-4,6-bis-(ethyl amino)-S-triazine (GESATOP®), terbuthylazine, or trietazine), methoxytriazine herbicides (e.g., atraton, methometon, prometone/prometon/2,4-bis(isopropyl amino)-6-methoxy-S-triazine (PRAMITOL®), secbumeton, simeton, or terbumeton), or methylthiotriazine herbicides (e.g., ametryne/ametryn/2-(ethyl amino)-4-(isopropyl-amino)-6-(methyl amino)-S-triazine (GESAPAX®), aziprotryne, cyanatryn, desmetryn, dimethametryn, methoprotryne, prometryn, simetryn, or terbutryn/terbutryne/2,4-bis(isopropyl amino)-6-methoxy-S-triazine (tert-butylamino)-4 (ethyl amino)-6-(methylthio)-S-triazine (IGRAN®)), a triazinone herbicide (e.g., ametridione, amibuzin, hexazinone, isomethiozin, metamitron, or metribuzin/4-amino-6-tert-butyl 3-(methylthio)-S-triazine-5(4H) one (SENCOR®)), a triazole herbicide (e.g., amitrole/3-amino-1,2,4-triazole (WEEDAZOL®), cafenstrole, epronaz, or flupoxam), a triazolone herbicide (e.g., amicarbazone, carfentrazone, flucarbazone, propoxycarbazone, or sulfentrazone), a triazolopyrimidine herbicide (e.g., cloransulam, diclosulam, florasulam, flumetsulam, metosulam, penoxsulam, uracil herbicides, butafenacil, flupropacil, isocil, lenacil, bromacil/5-bromo-6-methyl 1 3,5-butyl uracil (HYVAR-X®), or terbacil/5-chloro-6-methyl 3-T butyl uracil (SINBAR®)), aminotriazole, amitrole/3-amino-1,2,4-triazole (WEEDAZOL®), endothal/3, 6-endoxohexa hydrophthalic acid/7-oxabicyclo[2.2.1] heptane-2,3-dicarboxylic acid (ENDOTHALL®), oxadiazon/2-butyl-4-(2-,4-dichloro-5-isopropyl-1,3,4-oxadiazolin 5 oneoxyphenol) (RONSTAR®), or pyrazon/5-amino-4-chloro-2-phenyl 3 (2H) pyridazinone (PYRAMIN®)), a thiocarbamate herbicide (e.g., butylate, cycloate, diallate/S-(2,3-dichloro allyl) diisopropylthiocarbamate (AVADEX®), S-ethyldipropylthiocarbamate (EPTC) (EPTAM®), esprocarb, ethiolate, isopolinate, methiobencarb, molinate/S-ethyl hexahydro-I H-azapine 1-carbothionate (ORDAM-72®), orbencarb, pebulate, prosulfocarb, pyributicarb, sulfallate, thiobencarb, tiocarbazil, triallate/S-(2,3,3-trichloro allyl) diisopropylthiocarbamate (AVADEX BW®), vernolate (e.g., benthiocarb/S-(4-chlorobenzyl)-N, N-diethyl thio-carbamate (SATURN®, BOLERO®), 2-chloro allyl diethyl dithiocarbamate (CDEC) (VEGADEX®), bentazon/bentazone/3-isopropyl-2,1,3-benzo-thiadiazon-4-one-2,2-dioxide (BESAGRAN BSA-3510®), or parathion), a thiocarbonate herbicide (e.g., dimexano, thioperoxydicarbonic acid diethyl ester (EXD), or proxan), a substituted urea herbicide (e.g., benzthiazuron, cumyluron, cycluron, dichloralurea, diflufenzopyr, isonoruron, isouron, methabenzthiazuron, monisouron, noruron, methiuron, anisuron, buturon, linuron/3-(3,4-dichloro phenyl)-1,methoxy-1-methyl urea (LOROX®), chlorbromuron/3-(4-bromo-3-chlorophenyl)-1-methoxy-1-methyl urea (BROMEX®), chloreturon, chlorotoluron, chlorosulfuron, chloroxuron/3-(p-(p-chlorophenoxy) phenyl) 1,1-dimethyl urea (TENORON®), diuron/3-(3,4-dichlorophenyl) dimethyl urea (KARMEX®), fenuron TCA/1,1-dimethyl-3-phenyl-ureamon (trichloro acetate) (URAB®), fluometuron/1,1-dimethyl-3-(a,a,a-trifluoro m-tolyl) urea (COTORON®), monuron/3(p-chlorphenyl)-1,1-dimethylurea (TELVAR®), neburon/3,4-dichlorophenyl butyl, methyl urea (BONUS®), daimuron, difenoxuron, dimefuron, fluothiuron, isoproturon, methiuron, methyldymron, metobenzuron, metobromuron, metoxuron, monolinuron, parafluron, phenobenzuron, siduron, tetrafluron, thidiazuron, amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, oxasulfuron, primisulfuron, pyrazosulfuron, rimsulfuron, sulfometuron, sulfosulfuron, trifloxysulfuron, chlorsulfuron, cinosulfuron, ethametsulfuron, iodosulfuron, metsulfuron, prosulfuron, thifensulfuron, triasulfuron, tribenuron, triflusulfuron, tritosulfuron, buthiuron, ethidimuron, tebuthiuron, thiazafluron, or thidiazuron), C-288-methazole/2-(3,4-dichlorophenyl)-4-methyl-1,2-4-oxadiazolidine-3,5-dione (PROBE®), perfluidone/4-(phenyl sulphonyl)-1,1,1-trifluromethyl sulphono-o-toluidide (DESTUN®), fosmidomycin, acrolein, allyl alcohol, azafenidin, benazolin, benzobicyclon, buthidazole, calcium cyanamide ($CaCN_2$) (DORMEX®), cambendichlor, chlorfenac, chlorfenprop, chlorflurazole, chlorflurenol, cinmethylin, clomazone, 1-chloro-N'-(3,4-dichlorophenyl)-N,N-dimethyl-methanimidamide (CPMF), cresol, ortho-dichlorobenzene, dimepiperate, fluoromidine, fluridone, flurochloridone, flurtamone, fluthiacet, indanofan, methyl isothiocyanate, nipyraclofen, OCH, oxadiargyl, oxaziclomefone, pentachlorophenol, pentoxazone, phenylmercury acetate, pinoxaden, prosulfalin, pyrazolynate, pyribenzoxim, pyriftalid, quinoclamine, rhodethanil, sulglycapin, thidiazimin, tridiphane, trimeturon, tripropindan, or tritac.

In embodiments, the herbicide safener is benoxacor, cloquintocet, cyometrinil, dichlormid, dicyclonon, dietholate, fenchlorazole, fenclorim, flurazole, fluxofenim, furilazole, isoxadifen, mefenpyr, mephenate, naphthalic anhydride, or oxabetrinil.

In embodiments, the plant activator is acibenzolar or probenazole.

In embodiments, the plant growth regulator is an anti-auxin (e.g., clofibric acid or 2,3,5-tri-iodobenzoic acid), an auxin (e.g., 2-(4-chlorophenoxy)acetic acid (4-CPA), 2,4-dichlorophenoxyacetic acid (2,4-D), 4-(2,4-dichlorophenoxy)butyric acid (2,4-DB), 2,4-DEP, dichlorprop, fenoprop, indole-3-acetic acid (IAA), indole-3-butyric acid (IBA), naphthaleneacetamide, α-naphthaleneacetic acid, 1-naphthol, naphthoxyacetic acid, potassium naphthenate, sodium naphthenate, or 2,4,5-trichlorophenoxyacetic acid (2,4,5-T)), cytokinins (e.g., 2iP, benzyladenine, kinetin, or zeatin), defoliants (e.g., calcium cyanamide, dimethipin, endothal, ethephon, metoxuron, pentachlorophenol, thidiazuron, or tribufos), ethylene inhibitors (e.g., aviglycine or 1-methylcyclopropene), ethylene releasers (e.g., 1-aminocyclopropane-1-carboxylic acid (ACC), etacelasil, ethephon, or glyoxime), gibberellins (e.g., gibberellic acid), growth inhibitors (e.g., abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat chloride, piproctanyl, prohydrojasmon, propham, 2,3,5-tri-iodobenzoic acid, morphactins (e.g., chlorfluren, chlorflurenol, dichlorflurenol, or flurenol), growth retardants (e.g., chlormequat chloride (CYCOCEL®), daminozide (B-NINE®), flurprimidol, mefluidide, paclobutrazol, tetcyclacis, or uniconazole), growth stimulators (e.g., brassinolide, forchlorfenuron, or hymexazol), benzofluor, buminafos, carvone, ciobutide, clofencet, cloxyfonac, cyclanilide, cycloheximide, epocholeone, ethychlozate, ethylene, fenridazon, heptopargil, holosulf, inabenfide, karetazan, lead arsenate, methasulfocarb, prohexadione, pydanon, sintofen, triapenthenol, or trinexapac.

In embodiments, the molluscicide is calcium arsenate, copper acetoarsenite (i.e., Paris green/pigment green 21/$C_4H_6As_6Cu_4O_{16}$)), copper sulfate, N-bromoacetamide ($C_2H_4BrNO$), metaldehyde, niclosamide, pentachlorophenol, sodium pentachlorophenoxide, phenyl methylcarbamates (e.g., cloethocarb, methiocarb, tazimcarb, thiodicarb, or trimethacarb), organotin fungicides (e.g., triethyl tin oxide, tributyl tin oxide, triphenyl acetate tin, or fentin), or trifenmorph.

In embodiments, the insecticide is a muscacide, an ectoparasiticide/acaricide (e.g., antibiotic acaricides (e.g., nikkomycins, thuringiensin, macrocyclic lactone acaricides, tetranactin, avermectin acaricides (e.g., abamectin (AVID®), doramectin, eprinomectin, ivermectin, or selamectin), or milbemycin acaricides (e.g., milbemectin, milbemycin oxime, or moxidectin)), azobenzene, benzoximate, benzyl benzoate, bromopropylate, chlorbenside, chlorfenethol, chlorfenson, chlorfensulphide, chlorobenzilate, chloropropylat, dichlorodiphenyltrichloroethane (DDT), dicofol (KELTHANE®, MITIGAN®), diphenyl sulfone, dofenapyn, fenson, fentrifanil, fluorbenside, proclonol, tetradifon, tetrasul, benomyl (BENLATE®), carbanolate, carbaryl, carbofuran, methiocarb, metolcarb, promacyl, propoxur, aldicarb, butocarboxim, oxamyl, thiocarboxime, thiofanox, binapacryl, dinex, dinobuton, dinocap (e.g., dinocap-4 or dinocap-6), dinocton, dinopenton, dinosulfon, dinoterbon, 4,6-dinitro-o-cresol (DNOC), amitraz, chlordimeform, chloromebuform, formetanate, formparanate, mite growth regulators (e.g., clofentezine, diflovidazin, dofenapyn, fluazuron, flubenzimine, flucycloxuron, flufenoxuron, or hexythiazox), organochlorine acaricides (e.g., bromocyclen, camphechlor, DDT, dienochlor (PENTAC QQUAFLOW®), endosulfan, or lindane), organophosphorus acaricides (e.g., chlorfenvinphos, crotoxyphos, dichlorvos, heptenophos, mevinphos, monocrotophos, naled, schradan, tetraethyl pyrophosphate (TEPP), tetrachlorvinphos, amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton (e.g., demeton-O or demeton-S), demeton-methyl (e.g., demeton-O-methyl or demeton-S-methyl), demeton-S-methylsulphon, dialifos, diazinon, dimethoate, dioxathion, disulfoton, endothion, ethion, ethoate-methyl, formothion, malathion, mecarbam, methacrifos, omethoate, oxydeprofos, oxydisulfoton, parathion, phenkapton, phorate, phosalone, phosmet, phoxim, pirimiphos-methyl, prothidathion, prothoate, pyrimitate, quinalphos, quintiofos, sophamide, sulfotep, thiometon, triazophos, trifenofos, vamidothion, trichlorfon, isocarbophos, methamidophos, propetamphos, phosphorodiamide acaricides, dimefox, or mipafox), organotin acaricides (e.g., azocyclotin, cyhexatin (DOWCO 213®, PLICTRAN®), or fenbutatin-oxide (TORQUE®, VENDEX®)), dichlofluanid, dialifos, phosmet, acetoprole, fipronil, tebufenpyrad, vaniliprole, pyrethroid acaricides (e.g., acrinathrin, bifenthrin, cyhalothrin, cypermethrin (e.g., alpha-cypermethrin), fenpropathrin, fenvalerate, flucythrinate, flumethrin, fluvalinate (e.g., tau-fluvalinate), permethrin, or halfenprox), pyrimidifen, chlorfenapyr, chinomethionat, thioquinox, propargite, clofentezine, diflovidazin, spirodiclofen, fenothiocarb, chloromethiuron, diafenthiuron, acequinocyl, amidoflumet, arsenous oxide, bifenazate, closantel, crotamiton, disulfiram, etoxazole, fenazaflor, fenazaquin, fenpyroximate, fluacrypyrim, fluenetil, mesulfen, 2-fluoro-N-methyl-N-(1-naphthalenyl)acetamide (MNAF), nifluridide, pyridaben, sulfiram, sulfluramid, sulfur, or triarathene), an antibiotic insecticide (e.g., allosamidin, thuringiensin, macrocyclic lactone insecticides (e.g., spinosad), avermectin insecticides (e.g., abamectin (AVID®), doramectin, emamectin, eprinomectin, ivermectin, or selamectin), or milbemycin insecticides (e.g., milbemectin, milbemycin oxime, or moxidectin)), an arsenical insecticide/arsenical (e.g., calcium arsenate, copper acetoarsenite, copper arsenate, lead arsenate, potassium arsenite, or sodium arsenite), a carbamate insecticide/carbamate acetylcholinesterase (AChE) inhibitor (e.g., bendiocarb, carbaryl, benzofuranyl methylcarbamate insecticides (e.g., benfuracarb, carbofuran, carbosulfan, decarbofuran, or furathiocarb), dimethylcarbamate insecticides (e.g., dimetan, dimetilan, hyquincarb, or pirimicarb), oxime carbamate insecticides (e.g., alanycarb, aldicarb, aldoxycarb, butocarboxim, butoxycarboxim, methomyl, nitrilacarb, oxamyl (OXAMYL®), tazimcarb, thiocarboxime, thiodicarb, or thiofanox), phenyl methylcarbamate insecticides (e.g., allyxycarb, aminocarb, bufencarb, butacarb, carbanolate, cloethocarb, dicresyl, dioxacarb, 4-(ethylthio)phenyl N-methylcarbamate (EMPC), ethiofencarb, fenethacarb, fenobucarb, isoprocarb, methiocarb, metolcarb, mexacarbate, promacyl, promecarb, propoxur, trimethacarb, 3,5-dimethylphenyl N-methylcarbamate (XMC), or xylylcarb), a dinitrophenol insecticide (e.g., dinex, dinoprop, dinosam, or 2-methyl-4,6-dinitrophenol/dinitro-o-cresol (DNOC) (SINOX®)), a fluorine insecticide (e.g., fluosilicates (e.g., barium hexafluorosilicate or sodium hexafluorosilicate), cryolite, sodium fluoride, or sulfluramid), a formamidine insecticide (e.g., amitraz, chlordimeform, formetanate, or formparanate), a fumigant insecticide (e.g., acrylonitrile, carbon disulfide, carbon tetrachloride, chloroform, chloropicrin, p-dichlorobenzene1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride, or tetrachloroethane), an inorganic insecticide (e.g., borax, calcium polysulfide, copper oleate, mercurous chloride, potassium thiocyanate, or sodium thiocyanate), an insect growth regulator (e.g., chitin synthesis inhibitors (e.g., bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, or triflumuron), juvenile hormone mimics (e.g., epofenonane, fenoxycarb, hydroprene, kinoprene (ENSTAR®), methoprene, pyriproxyfen, or triprene), juvenile hormones (e.g., juvenile hormone I, juvenile hormone II, or juvenile hormone III), moulting hormone agonists (e.g., chromafenozide, halofenozide, methoxyfenozide, or tebufenozide), moulting hormones (e.g., ecdysone or ecdysterone), moulting inhibitors (e.g., diofenolan), precocenes (e.g., precocene I, precocene II, or precocene III), or dicyclanil), a nereistoxin analogue insecticide (e.g., bensultap, cartap, thiocyclam, or thiosultap), a nicotinoid insecticide (e.g., flonicamid, clothianidin, dinotefuran, imidacloprid, thiamethoxam, nitenpyram, nithiazine, acetamiprid, imidacloprid, nitenpyram, or thiacloprid), an organochlorine/chlorinated hydrocarbons insecticide (e.g., dichlorodiphenyltrichloroethane (DDT) (e.g., pp-DDT), bromo-DDT, camphechlor, dichlorodiphenyldichloroethane (ethyl-DDD), hexachlorocyclohexane (HCH) (e.g., gamma-HCH or lindane), methoxychlor, pentachlorophenol, dichlorodiphenyldichloroethane (TDE), cyclodiene insecticides (e.g., Aldrin, bromocyclen, chlorbicyclen, chlordane, chlordecone, dieldrin, dilor, endosulfan, endrin, 1,2,3,4,10,10-hexachloro-6,7-epoxy-1,4,4a,5,6,7,8,8a-octahydro-endo-1,4-exo-5,8-dimethanonaphthalene (HEOD), heptachlor, (1R,4S,4aS,5S,8R,8aR)-1,2,3,4,10,10-hexachloro-1,4,4a,5,8,8a-hexahydro-1,4:5,8-dimethanonaphthalene (HHDN), isobenzan, isodrin, kelevan, or mirex), voltage-gated $Na^+$ channels inhibitors, or chlorinated cyclodienes $GABA_A$ antagonists), an organophosphorus insecticide (e.g., bromfenvinfos, chlorfenvinphos, crotoxyphos, dichlorvos, dicrotophos, dimethylvinphos, fospirate, heptenophos, methocrotophos, mevinphos, monocrotophos, naled, naftalofo, phosphamidon, propaphos, schradan, tetraethyl pyrophosphate (TEPP), tetrachlorvinphos, dioxabenzofos, fosmethilan, phenthoate, acethion, amiton, cadusafos, chlorethoxyfos, chlormephos, demephion (e.g., demephion-O or demephion-S), demeton (e.g., demeton-O or demeton-S), demeton-methyl (e.g., demeton-O-methyl or demeton-S-methyl), demeton-S-methylsulphon, disulfoton, ethion, ethoprophos, S-[(ethylsulfinyl)methyl] O,O-bis(1-methylethyl) phosphorodithioate (IPSP), isothioate, malathion, methacrifos, oxydemeton-methyl (METASYSTOX®), oxydeprofos, oxydisulfoton, phorate, sulfotep, terbufos, thiometon, amidithion, cyanthoate, dimethoate, ethoate-methyl, formothion, mecarbam, omethoate, prothoate, sophamide, vamidothion, chlorphoxim, phoxim, phoxim-methyl, azamethiphos, coumaphos, coumithoate, dioxathion, endothion, menazon, morphothion, phosalon, pyraclofos, pyridaphenthion, quinothion, dithicrofos, thicrofos, azinphos-ethyl, azinphos-methyl, dialifos, phosmet, isoxathion, zolaprofos, chlorprazophos, pyrazophos, chlorpyrifos, chlorpyrifos-methyl, butathiofos, diazinon, etrimfos, lirimfos, pirimiphos-ethyl, pirimiphos-methyl, primidophos, pyrimitate, tebupirimfos, quinalphos, quinalphos-methyl, athidathion, lythidathion, methidathion, prothidathion, isazofos, triazophos, azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos, butonate, trichlorfon, mecarphon, fonofos, trichloronat, cyanofenphos, O-ethyl O-(4-nitrophenyl) phenylphosphonothioate (EPN), leptophos, crufomate, fenamiphos, fosthietan, mephosfolan, phosfolan, pirimetaphos, acephate (ORTHENE®), isocarbophos, isofenphos, methamidophos, propetamphos, dimefox, mazidox, mipafox, oxadiazine insecticides, or indoxacarb), a phthalimide insecticide (e.g., dialifos, phosmet, or tetramethrin), a pyrazole insecticide (e.g., acetoprole, ethiprole, fipronil, tebufenpyrad, tolfenpyrad, or vaniliprole), a pyrethroid insecticide (e.g., acrinathrin, allethrin (e.g., bioallethrin), barthrin, bifenthrin, bioethanomethrin, cyclethrin, cycloprothrin, cyfluthrin (e.g., beta-cyfluthrin), cyhalothrin (e.g., gamma-cyhalothrin or lambda-cyhalothrin), cypermethrin (e.g., alpha-cypermethrin, beta-cypermethrin, theta-cypermethrin, or zeta-cypermethrin), cyphenothrin, deltamethrin, dimefluthrin, dimethrin, empenthrin, fenfluthrin, fenpirithrin, fenpropathrin, fenvalerate (e.g., esfenvalerate), flucythrinate, fluvalinate (e.g., tau-fluvalinate (MAVRIK®)), furethrin, imiprothrin, metofluthrin, permethrin (e.g., biopermethrin or transpermethrin), phenothrin, prallethrin, profluthrin, pyresmethrin, resmethrin (e.g., bioresmethrin or cismethrin), tefluthrin, terallethrin, tetramethrin, tralomethrin, transfluthrin, etofenprox, flufenprox, halfenprox, protrifenbute, or silafluofe), a pyrimidinamine insecticide (e.g., flufenerim or pyrimidifen), a pyrrole insecticide (e.g., chlorfenapyr), a tetronic acid insecticide (e.g., spiromesifen), a thiourea insecticide (e.g., diafenthiuron, urea insecticides, flucofuron, or sulcofuron), closantel, crotamiton, thioperoxydicarbonic acid diethyl ester (EXD), fenazaflor, fenoxacrim, hydramethylnon, isoprothiolane, malonoben, metoxadiazone, nifluridide, pyridaben, pyridalyl, rafoxanide, triarathene, triazamate, fluosilicate, lethane, thanite, magnesium phosphide (DETIA GAS-EX-B-FORTE®), imidachloprid (ADMIRE®, MARATHON®, RAXIL SECUR®), insecticidal soap (M-PEDE®, SAFER SOAP®), or chinomethionat (MORESTAN®).

In embodiments, the repellant is an insect repellant, a bird repellant, or a mammal repellant. In embodiments, the repellant is an insect repellant. In embodiments, the repellant is a bird repellant. In embodiments, the repellant is a mammal repellant. In embodiments, the insect repellant is butopyronoxyl, dibutyl phthalate, N,N-diethyl-m-toluamide (DEET) (AUTAN EXTREME®), dimethyl carbate, dimethyl phthalate, ethohexadiol, hexamide, methoquin-butyl, methylneodecanamide, oxamate, picaridin/KBR 3023, Citronella, Pelargoniumon, or SS-220. In embodiments, the bird repellant is anthraquinone, chloralose, copper oxychloride/R6, diazinon, guazatine, methiocarb, thiram, trimethacarb, or ziram. In embodiments, the mammal repellant is copper naphthenate, trimethacarb, zinc naphthenate, or ziram.

In embodiments, the repellant is butopyronoxyl, dibutyl phthalate, N,N-diethyl-m-toluamide (DEET) (AUTAN EXTREME®), dimethyl carbate, dimethyl phthalate, ethohexadiol, hexamide, methoquin-butyl, methylneodecanamide, oxamate, picaridin/KBR 3023, Citronella, Pelargoniumon, SS-220, anthraquinone, chloralose, copper oxychloride/R6, diazinon, guazatine, methiocarb, thiram, trimethacarb, ziram, copper naphthenate, or zinc naphthenate.

In embodiments, the avicide is 4-aminopyridine, chloralose, endrin, fenthion, or strychnine.

In embodiments, the rodenticide is an indandione rodenticide (e.g., chlorophacinone, diphacinone, or pindone), an organophosphorus rodenticide (e.g., phosacetim), a pyrimidinamine rodenticide (e.g., crimidine), a γ-glutamyl-carboxylase inhibitor (coumarin rodenticide) (e.g., brodifacoum, bromadiolone, coumachlor, coumafuryl, coumatetralyl, difenacoum, difethialone, flocoumafen, or warfarin), an aconitase inhibitor (e.g., fluoracetamide or sodium fluoroacetate), an inorganic rodenticide (e.g., aluminum phosphide (CELPHOS®, DEGESCH FUMIGATION TABLETS®, FUMITOXIN®), arsenous oxide, white or yellow elemental phosphorus, potassium arsenite, sodium arsenite, or thallium sulfate), a thiourea rodenticide (e.g., α-naphthylthiourea (ANTU) (ANTU®)), a urea rodenticide (e.g., pyrinuron), a fumigant (e.g., calcium cyanide ($CaCN_2$) (CYMAG®), carbon monoxide (CO), carbon dioxide ($CO_2$), petrol chloroform, carbon tetrachloride ($CCl_4$), dichloroethane, ethylene dibromide, dibromochloropropane, methyl bromide, EDTC mixture, gamma-hexachlorocyclohexane (gamma-HCH), HC, lindane, a GABA antagonist (e.g., tetramine (tetramethylene disulfotetramine)), a voltage gated sodium channels inhibitor (e.g., dichlorodiphenyl trichloroethane (DDT)), bromethalin, chloralose, α-chlorohydrin, ergocalciferol, flupropadine, hydrogen cyanide, or norbomide (RATICATE®).

In embodiments, the synergist is piperonyl butoxide, piprotal, propyl isome, sesamex, sesamolin, or sulfoxide.

In embodiments, the antifeedant is chlordimeform, fentin, guazatine, or pymetrozine.

In embodiments, the chemosterilant is apholate, bisazir, busulfan, diflubenzuron, dimatif, hemel, hempa, metepa, methiotepa, methyl apholate, morzid, penfluron, tepa, thiohempa, thiotepa, tretamine, or uredepa.

In embodiments, the agriculturally active ingredient comprises a copper chromated arsenate (CCA), calcium cyanide, a dinitrophenol, a naphthylindane-1,3-dione, nicotine sulfate, nonanol, piperazine, a polybutene, potassium ethylxanthate, sodium cyanide, a thiocyanatodinitrobenzene, a trichlorotrinitrobenzene, or zinc trichlorophenoxide.

In embodiments, the agricultural formulation comprises a herbicide selected from the group consisting of glyphosate, glufosinate, thiocarbamates, difenzoquat, pyridazinone, nicotinanilide, fluridone, isoxazolidinone, diphenylether; N-phenylphthalimide, oxadiazole, triazolinone, chloroacetamides, oxyacetamide, phthalamate, N-phenylphthalimide, oxadiazole, triazolinone, acetamides, benzoylisoxazol, isoxazole, pyrazole, pyrazolium, triketone, benzofuran, acetochlor, clethodim, dicamba, flumioxazin, fomesafen, metolachlor, triasulfuron, mesotrione, topramezone, quizalofop, saflufenacil, sulcotrione, 2,4-dichlorophenoxyacetic, salts thereof, and mixtures thereof.

In embodiments, compositions may comprise a micronutrient, which comprises an element selected from the group consisting of boron, copper, manganese, iron, chlorine, molybdenum, zinc, and mixtures thereof.

Agricultural agents may be present in any suitable amount known by one of skill in the art. In embodiments, the agricultural agent is present in an amount from about 0.01% to about 90% by weight of the suspension. In embodiments, the agricultural agent is present in an amount of from about 0.05% to about 80% by weight of the suspension. In embodiments, the agricultural agent is present in an amount of from about 0.05% to about 70% by weight of the suspension. In embodiments, the agricultural agent is present in an amount from about 0.1% to about 60% by weight of the suspension. In embodiments, the agricultural agent is present in an amount of from about 1% to about 40% by weight of the suspension. In embodiments, the agricultural agent is present in an amount of about 1%, 2%, 3%, 4%, 5%, 6%, 7%, 8%, 9%, 10%, 15%, 20%, 25%, 30%, 35%, 40%, 45%, or 50% by weight of the suspension.

Microfibrillated cellulose useful in embodiments herein includes any suitable microfibrillated cellulose known by one of skill in the art. In embodiments, the microfibrillated cellulose is Exilva F 01-V.

Microfibrillated cellulose is present in any suitable amount known by one of skill in the art. In embodiments, the microfibrillated cellulose is present in an amount from about 0.005% to about 20% by weight of the composition. In embodiments, the microfibrillated cellulose is present in an amount of from about 0.005% to about 10% by weight of the composition. In embodiments, the microfibrillated cellulose is present in an amount of from about 0.01% to about 10% by weight of the composition. In embodiments, the microfibrillated cellulose is present in an amount from about 0.01% to about 5% by weight of the composition. In embodiments, the microfibrillated cellulose is present in an amount of from about 0.01%, 0.05%, 1%, 2%, 3%, 4%, 5%, 6%, 7%, 8%, 9% or 10% by weight of the composition. In embodiments, the microfibrillated cellulose is present in an amount of about 3% by weight of the composition.

The size of the agricultural agent useful in embodiments herein can have any suitable size known by one of skill in the art. In embodiments, the particulate comprises a solid agricultural agent having a median particle size in a range from about 0.05 micron to about 30 microns. In In embodiments, the particulate comprises a solid agricultural agent having a median particle size in a range from about 1 micron to about 30 microns. In embodiments, the particulate comprises a solid agricultural agent having a median particle size in a range from about 0.05 micron to about 15 microns, or from about 15 microns to about 30 microns. In embodiments, the particulate comprises a solid agricultural agent having a median particle size in a range from about 1 micron to about 15 microns. In embodiments, the particulate comprises a solid agricultural agent having a median particle size in a range of from about 5 microns to about 15 microns. In embodiments, the particulate comprises a solid agricultural agent having a median particle size of about 1, 2, 3, 4, 5, 6, 7, 8, 9, 10, 11, 12, 13, 14, 15, 16, 17, 18, 19, or 20 microns. In embodiments, the particulate comprises a solid agricultural agent having a median particle size of about 10 micron.

Particulate forms useful in embodiments herein includes any suitable particulate form known by one of skill in the art. In embodiments, the particulate is a capsule suspension (CS), suspension concentrate (SC), microemulsion (ME), emulsion concentrate, oil dispersion (OD), wettable powders (WP), water dispersible powders for slurry seed treatment (WS), water dispersible granules (WG), emulsifiable granules (EG), and emulsifiable powders (EP). In embodiments, the particulate is a capsule suspension. In embodiments, the capsule suspension comprises a capsule formed by encapsulating the agricultural agent in an encapsulating wall comprising a compound selected form the group consisting of polysaccharides, oligosaccharides, cyclodextrin, alkyl ethoxylates, polyurea, polyurethane, polycarbonate, polyamide, and polysulfonamide, any of which is optionally crosslinked and combinations thereof.

Capsules useful in embodiments herein include any suitable capsule known by one of skill in the art. In embodiments, the capsule is formed by encapsulation of the agricultural agent in an encapsulating wall comprising a compound selected from the group consisting of a cyclodextrin, alkyl ethoxylates having linear chains of 20 to 50 carbons and 20 to 90 percent ethoxylation, a polyurea, a polyurethane, a polycarbonate, a polyamide, and a polysulfonamide, any of which is optionally crosslinked and combinations thereof. In embodiments, the capsule is formed by encapsulation of the agricultural agent in an encapsulating wall comprising a compound selected from a polyurea, or combinations thereof.

In embodiments, the capsule is a crosslinked polyurea derived from a polyisocyanate and a crosslinking agent. In embodiments, the capsule is a crosslinked polyurea is derived from an aromatic polyisocyanate or aliphatic isocyanate and a crosslinking agent. In embodiments, the capsule is a crosslinked polyurea is derived from an aromatic polyisocyanate and a crosslinking agent.

Polyisocyanates useful in embodiments herein includes any suitable polyisocyanate known by one of skill in the art. In embodiments, the polyisocyanate is selected from an aromatic polyisocyanate or an aliphatic isocyanate. In embodiments, the polyisocyanate is selected from poly (phenyl isocyanate)-co-formaldehyde, toluene diisocyanate, phenylene diisocyanate, methylene diphenyl diisocyanate, polymethylene polyphenylene isocyanate, 2,4,4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate, 4,4'4"-triphenylmethane triisocyanate, m-xylylene diisocyanate, tetramethylene diisocyanate, pentamethylene diisocyanate, hexamethylene diisocyanate, 1,8-diisocyanatooctane, and 1,4-cyclohexylene diisocyanate. In embodiments, the polyisocyanate is selected from poly (phenyl isocyanate)-co-formaldehyde, tetramethylene diisocyanate, pentamethylene diisocyanate, hexamethylene diisocyanate, toluene diisocyanate, diphenylmethene-4,4'-diisocyanate, polymethylene polyphenylene isocyanate, 2,4,4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate and 4,4'4"-triphenylmethane triisocyanate. In embodiments, the polyisocyanate is poly (phenyl isocyanate)-co-formaldehyde.

Crosslinking agents useful in embodiments herein includes any suitable crosslinking agent known by one of skill in the art. In embodiments, the crosslinking agent comprises a polyamine, a thiol, a haloalkyl, or a combination thereof. In embodiments, the crosslinking agent comprises a polyamine.

Polyamines useful in embodiments herein includes any suitable polyamine. In embodiments, the polyamine is a diamine, a triamine, or a tetraamine. In embodiments, the polyamine is diethylenetriamine, ethylenediamine, propylene-1,3-diamine, tetramethylenediamine, pentamethylenediamine, 1,6-hexamethylenediamine, diethylenetriamine, triethylenetetramine, tetraethylenepentamine, pentaethylenehexamine, 4,9-dioxadodecane-1,12-diamine, 1,3-phenylenediamine, 2,4- and 2,6-toluenediamine and 4,4'-diaminodiphenylmethan, polyethylenimine (PEI), polyimine, or mixtures thereof. In embodiments, the polyamine is diethylenetriamine.

The encapsulating wall is present in any suitable amount known by one of skill in the art. In embodiments, the encapsulating wall is present in an amount of from 0.05% to 80% by weight of the composition. In embodiments, the encapsulating wall is present in an amount of from 0.05% to 60% by weight of the composition. In embodiments, the encapsulating wall is present in an amount of from 0.1% to 50% by weight of the composition. In embodiments, the encapsulating wall is present in an amount of from 0.1% to 30% by weight of the composition. In embodiments, the encapsulating wall is present in an amount of from 0.1% to 10% by weight of the composition. In embodiments, the encapsulating wall is present in an amount of from 0.25%, 0.5%, 1%, 1.5%, 2%, 3%, 4%, 5%, 6%, 7%, 8%, 9%, or 10% by weight of the composition.

In embodiments, compositions further comprises a polymeric dispersant. Polymeric dispersants useful in embodiments herein includes any suitable polymeric dispersant known by one of skill in the art. In embodiments, the polymeric dispersant is selected from the group consisting of anionic polymeric dispersants, lignosulfonates, alkyl aryl formaldehyde condensates, non-ionic polymeric dispersants, polyvinyl alcohols, acrylic copolymers, and acrylic comb dispersant. In embodiments, the polymeric dispersant is an acrylic comb polymeric dispersant. In embodiments, the polymeric dispersant is acrylic polymer. In embodiments, the polymeric dispersant is Envi-Pol 871.

In embodiments, the microfibrillated cellulose is preprocessed with a wetting agent or dispersant under shear conditions. In embodiments, the wetting agent or dispersant is an aqueous mixture, organic mixture, acrylic polymer, acrylic copolymer, polyurea, polyisocyanate, polyamine, polyamide, or acrylic comb dispersant.

In embodiments, compositions may further comprise an additional rheology modifier. In embodiments, the rheology modifier is selected from the group consisting of polysaccharides, oligosaccharides, monosaccharides, xanthan gums, guar gums, locust gums, clays, silicas, starches, rheo-surfactants, and mixtures thereof. In embodiments, the rheology modifier is selected from the group consisting of polysaccharides, xanthan gums, guar gums, locust gums, clays, silicas, starches, rheo-surfactants, and mixtures thereof. In embodiments, the rheology modifier is a xanthan gum. In embodiments, the rheology modifier is Kelzan S Plus.

Rheology modifiers are present in any suitable amount known by one of skill in the art. In embodiments, the rheology modifier is present in an amount from about 0.01% to about 5% by weight of the suspension. In embodiments, the rheology modifier is present in an amount from about 0.01% to about 3% by weight of the suspension. In embodiments, the rheology modifier is present in an amount from about 0.01% to about 1% by weight of the suspension. In embodiments, the rheology modifier is present in an amount from about 0.05% to about 0.5% by weight of the suspension. In embodiments, the rheology modifier is present in an amount from about 0.1% to about 0.3% by weight of the suspension. In embodiments, the rheology modifier is present in an amount of about 0.05%, 0.06%, 0.07%, 0.08%, 0.09%, 0.10%, 0.12%, 0.13%, 0.14%, or 0.15% by weight of the suspension.

In embodiments, compositions may further comprise of a biocide. Biocides useful in embodiments herein includes any biocides known by one of skill in the art. In embodiments, the biocide is selected from the group consisting of isothiazolinone, formaldehyde, paraformaldehyde, alcohols, phenols, butylated hydroxytoluene, and ethylene oxide. In embodiments, the biocide is selected from the group consisting of isothiazolinone, formaldehyde, and butylated hydroxytoluene. In embodiments, the biocide is Proxel GXL.

In embodiments, compositions may further comprise an antifoaming agent. In embodiments, the antifoaming agent is a silicone emulsion, silicone, hydrophobic silica, kerosene, fuel oil, vegetable oil, fatty alcohols and ethylene bis stearamide. In embodiments, the antifoaming agent is a silicone emulsion. In embodiments, the antifoaming agent is Xiameter AFE-0010.

Emulsifiers useful in embodiments herein includes any suitable emulsifier known by one of skill in the art. In embodiments, the emulsifier can form an oil in water emulsion. In embodiments, the emulsifier is monoethanolamine, polyoxyethylene fatty acid esters, polyoxyethylene fatty alcohol ethers, alkylaryl polyglycol ethers, alkylsulfonates, alkyl sulfates, arylsulfonates, protein hydrolysates, or polyvinyl pyrrolidone polymer, wherein the polyvinyl pyrrolidone polymer is optionally alkylated. In embodiments, the emulsifier is phenol, alcohol, fatty alcohol, aromatic sulfonate, silicone, or silicone derivatives. In embodiments, compositions may further comprise ethanolamine.

The viscosity of the composition can be any suitable viscosity known by one of skill in the art. In embodiments, the composition comprises a viscosity from about 1,000 mPa·s to about 30,000 mPa·s. In embodiments, the composition comprises a viscosity from about 2,000 mPa·s to about 25,000 mPa·s. In embodiments, the composition comprises a viscosity from about 5,000 mPa·s to about 25,000 mPa·s. In embodiments, the composition comprises a viscosity from about 5,000 mPa·s to about 20,000 mPa·s. In embodiments, the composition comprises a viscosity from about 5,000 mPa·s to about 15,000 mPa·s. In embodiments, the composition comprises a viscosity from about 2,000 mPa·s to about 25,000 mPa·s at 25° C. at a shear rate of 0.1 to 0.2 reciprocal seconds.

The ratio of chlorethoxyfos to bifenthrin by percent weight can be any suitable ratio known by one of skill in the art. In embodiments, the ratio of chlorethoxyfos to bifenthrin is about 50:1 to about 1:50 by percent weight. In embodiments, the ratio of chlorethoxyfos to bifenthrin is about 30:1 to about 1:30 by percent weight. In embodiments, the ratio of chlorethoxyfos to bifenthrin is about 30:1 to about 1:1 by percent weight. In embodiments, the ratio of chlorethoxyfos to bifenthrin is about 25:1 to about 5:1 by percent weight. In embodiments, the ratio of chlorethoxyfos to bifenthrin is about 8:1 to about 4:1 by percent weight. In embodiments, the ratio of chlorethoxyfos to bifenthrin is about 6:1 by percent weight.

In embodiments, there are provided compositions comprising a capsule suspension of a mixture of chlorethoxyfos and bifenthrin; a polymeric dispersant; and microfibrillated cellulose. In embodiments, the capsule suspension is formed by encapsulating the chlorethoxyfos and bifenthrin in an encapsulating wall comprising is a polyurea.

Aqueous formulations useful in embodiments herein includes any suitable aqueous formulation known by one of skill in the art. In embodiments, the aqueous formulation comprises water, salts, organic solvents, and an agricultural agent. In embodiments, the aqueous formulation comprises water, organic solvents, an agricultural agent, polymeric dispersant, rheology modifier, acrylic polymers, crosslinking agents, and cellulose. In embodiments, the aqueous formulation comprises water, and an agricultural agent in particulate form as described herein. In embodiments, the aqueous formulation comprises water, an agricultural agent in particulate form as described herein, and microfibrillated cellulose.

In embodiments, compositions may further comprising a biocide.

In embodiments, the biocide is selected from the group consisting of isothiazolinone, formaldehyde, and butylated hydroxytoluene.

In embodiments, compositions may further comprising an antifoaming agent.

B. Methods

In embodiments, there are provided methods of making an encapsulated suspension comprising providing an aqueous mixture comprising a polymeric dispersant in water, adding to the aqueous mixture an organic mixture comprising an agricultural agent and polyisocyanate in an organic solvent, emulsifying the organic mixture in the aqueous mixture to a desired particle size emulsion, adding a crosslinking agent to the emulsion to provide an encapsulated agricultural agent and adding at least one rheology modifier comprising microfibrillated cellulose to the encapsulated agricultural agent to form a stable suspension.

In embodiments, the rheology modifier further comprises xanthan gum.

In embodiments, the agricultural agent comprises a mixture of chlorethoxyfos and bifenthrin.

In embodiments, methods may further comprise adding an emulsifier to the encapsulated agricultural agent.

In embodiments, methods may further comprise adding ethanolamine, triethanol, amine, an acrylic comb polymeric dispersant, an acrylic polymer or a combination thereof.

In embodiments, methods may further comprise dispersing the encapsulated suspension in an ionic liquid medium selected from a fertilizer, an ionic pesticide selected from glyphosate or glufosinate, a biopesticide, a biostimulant, or a micronutrient, wherein dispersing comprises minimal to no shear, and wherein the dispersed encapsulated suspension remains dispersed for at least one hour in the ionic medium.

In embodiments, the capsule is formed by encapsulation of the agricultural agent in an encapsulating wall comprising a compound selected from the group consisting of a cyclodextrin, alkyl ethoxylates having linear chains of 20 to 50 carbons and 20 to 90 percent ethoxylation, a polyurea, a polyurethane, a polycarbonate, a polyamide, and a polysulfonamide, any of which is optionally cross-linked and combinations thereof.

In embodiments, the capsule is a crosslinked polyurea derived from a polyisocyanate and a crosslinking agent.

In embodiments, the polyisocyanate is selected from poly(phenyl isocyanate)-co-formaldehyde, tetramethylene diisocyanate, pentamethylene diisocyanate, hexamethylene diisocyanate, toluene diisocyanate, diphenylmethene-4,4'-diisocyanate, polymethylene polyphenylene isocyanate, 2,4, 4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate and 4,4'4"-triphenylmethane triisocyanate.

In embodiments, the polyisocyanate is poly(phenyl isocyanate)-co-formaldehyde.

In embodiments, the crosslinking agent comprises a polyamine.

In embodiments, the polyamine is diethylenetriamine, ethylenediamine, propylene-1,3-diamine, tetramethylenediamine, pentamethylenediamine, 1,6-hexamethylenediamine, diethylenetriamine, triethylenetetramine, tetraethylenepentamine, pentaethylenehexamine, 4,9-dioxadodecane-1,12-diamine, 1,3-phenylenediamine, 2,4- and 2,6-toluenediamine and 4,4'-diaminodiphenylmethan, polyethylenimine (PEI), polyimine, or mixtures thereof.

In embodiments, the polyamine is diethylenetriamine.

In embodiments, embodiments herein provide a method of making an encapsulated suspension comprising: providing an aqueous mixture comprising polymeric dispersant in water; adding to the aqueous mixture an organic mixture comprising an agricultural agent and polyisocyanate in an organic solvent; emulsifying the organic mixture in the aqueous mixture to a desired particle size emulsion; adding a crosslinking agent to the emulsion to provide an encapsulated pesticide; and adding at least one rheology modifier comprising microfibrillated cellulose to the encapsulated pesticide to form a stable suspension.

Aqueous mixtures useful in embodiments herein includes any suitable aqueous mixture known by one of skill in the art. In embodiments, the aqueous mixture comprises water and a polymeric dispersant. In embodiments, the aqueous mixture comprises water, a polymeric dispersant, and an antifoaming agent. In embodiments, the aqueous mixture comprises water and a polyamine. In embodiments, the aqueous mixture comprises water, propylene glycol, a biocide, and microfibrillated cellulose. In embodiments, the aqueous mixture comprises water, Envi-Pol 871, and Xiameter AFE-0010. In embodiments, the aqueous mixture comprises water and diethylenetriamine (DETA). In embodiments, the aqueous mixture comprises water, propylene glycol, Proxel GXL, and Exilva F01-V.

Organic mixture useful in embodiments herein includes any suitable aqueous mixture known by one of skill in the art. In embodiments, the organic mixture comprises an organic solvent and an agricultural agent. In embodiments, the organic mixture comprises an organic solvent, an agricultural agent, and a polyisocyanate. In embodiments, the organic mixture comprises an organic solvent and a rheology modifier. In embodiments, the organic solvent comprises Aromatic 200ND, Fortress Technical, bifenthrin, and PAPI 27 Polymeric MDI. In embodiments, the organic mixture comprises propylene glycol and Kelzan S Plus.

Agricultural agents useful in the method of embodiments herein includes the agricultural agents described above. In embodiments, there are provided the agricultural agent comprises a mixture of chlorethoxyfos and bifenthrin.

Rheology modifiers useful in the method of embodiments herein includes the rheology modifiers described above. In embodiments, the rheology modifier further comprises xanthan gum. In embodiments, the rheology modifier further comprises Kelzan S Plus.

In embodiments, methods may further comprise adding an emulsifier to the encapsulated pesticide. Emulsifiers useful in the methods herein include the emulsifiers described above. In embodiments, the emulsifier is monoethanolamine.

C. Use

In embodiments, there are provided methods of treating a crop comprising providing a composition comprising an agricultural agent in particulate form, and a microfibrillated cellulose, wherein the particulate form is selected from the group consisting of a liquid droplet, a gel, or a combination thereof, and wherein the agricultural agent in particulate form are part of an emulsifiable concentrate (EC), a capsule suspension (CS), a suspo-emulsion (SE), a microemulsion (ME), or an oil dispersion (OD), the method comprising adding to the composition a fertilizer and/or water to provide a mixture and applying the mixture to a crop.

In embodiments, methods may be applied for foliar application.

In embodiments, methods may be applied for soil application.

In embodiments, methods may be applied for root application.

IV. EXAMPLES

Example 1

The following example is a liquid soil insecticide that can be used on corn (field corn, seed corn, sweet corn and popcorn) at planting for the control of western, northern, and southern corn rootworm; wireworm, cutworm, seedcorn maggot, white grub, sugarcane beetle, grape colapse and symphylan. This exemplary suspension contains chlorethoxyfos (25.8 percent) and bifenthrin (4.2%) as active ingredients, and is a capsule suspension type of formulation. Other pesticides and active ingredients may be readily interchanged as will be appreciated by those skilled in the art.

The suspension formulation comprises the following components:
A. Fortress Technical
   The active ingredient 1 is registered as: EPA Reg. No. 5481-492
   Chemical Name: (±)-O,O-Diethyl O-(1,2,2,2-tetrachloroethyl) phosphorothioate
   Common Name: Chlorethoxyfos
   CAS No. 54593-83-8
   Nominal Concentration: 88%
B. Bifenthrin Technical
   The active ingredient 2 is registered as: EPA Reg. NO 5481-505
   Chemical Name: 3-[(1Z)-2-Chloro-3,3,3-trifluoro-1-propenyl]-2,2-dimethylcyclopropanecarboxylic acid (2-methylbiphenyl-3-yl)methyl ester
   Common Name: Bifenthrin
   CAS NO. 82657-04-3
   Nominal Concentration: 96.2%
C. Water
   CAS NO. 7732-18-5
D. Aromatic 200
   Chemical Name: Solvent Naphtha(Petroleum), Heavy Aromatic Trade Name: Aromatic 200 ND
   CAS NO. 64742-94-5
E. Monoethanolamine
   Common Name: Ethanolamine
   CAS NO. 141-43-5
F. 1,2-propanediol
   CAS NO. 57-55-6
   Trade Name: Propylene Glycol
G. Envi-Pol 871
   Chemical Name: Envi-Pol 871
   CAS NO. Proprietary blend
H. Proxel™ GXL
   CAS NO. 2634-33-5
   Additional Information: Proxel GXL is a 19.3% solution, thus the nominal is equivalent to 0.048% w/w of 1,2-Benzisothiazolin-3-one
I. Xiameter AFE-0010
   CAS NO. Proprietary Blend
J. Cellulose
   Chemical Name: Exilva (10% Paste)
   CAS NO. 9004-34-6
K. Xanthan Gum
   CAS NO. 11138-66-2
   Trade Name: Kelzan S Plus
L. Cross-linked polyurea-type encapsulating polymer
   Polymer formed during formulation mixing
Procedure
   The formulation procedure is as follows:
   In a tank with a high-speed mixer equipped with an emulsification assembly:
   1. Add the appropriate amount of the aqueous phase.
   2. Add appropriate amount of the organic phase.
   3. Emulsify the mixture until the desired particle size is obtained.
   4. Using a paddle mixing assembly, add the appropriate ingredients to complete the interfacial polymerization.
   8. Check the product for assay and viscosity.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A composition comprising:

a capsule suspension (CS) of a mixture of chlorethoxyfos and bifenthrin in a liquid phase, the mixture being disposed within an encapsulating wall;

a polymeric dispersant;

0.01% to about 5% by dry weight microfibrillated cellulose, and optionally ethanolamine, and a high ionic strength medium, wherein the microfibrillated cellulose is chemically unmodified, wherein the composition exhibits time-dependent shear thinning.

2. The composition of claim 1, wherein the encapsulating wall comprises a polyurea.

3. The composition of claim 1, wherein the liquid phase comprises water.

4. The composition of claim 1, further comprising ethanolamine.

5. A composition comprising:

an agricultural agent in particulate form;

a microfibrillated cellulose, wherein the microfibrillated cellulose is present in an amount from about 0.01% to about 5% by dry weight of the composition and a high ionic strength medium;

wherein the particulate form is selected from the group consisting of a liquid droplet, a gel, or a combination thereof; and wherein the agricultural agent in particulate form are part of an emulsifiable concentrate (EC), a capsule suspension (CS), a suspo-emulsion (SE), a microemulsion (ME), or an oil dispersion (OD), wherein the microfibrillated cellulose is chemically unmodified, wherein the composition exhibits time-dependent shear thinning.

6. The composition of claim 5, wherein the composition further comprises solid particulates, metamict state particulates, or combinations thereof.

7. The composition of claim 5, further comprising a polymeric dispersant.

8. The composition of claim 5, wherein the agricultural agent comprises one or more of a pesticide, a biological pesticide, an herbicide, an insecticide, a plant growth regulator, a biostimulant, a UV-protectant, a dust repellant, a hormone, a fertilizer, a micronutrient or combinations thereof.

9. The composition of claim 6, wherein the solid particulate, metamict state particulates, or combinations thereof comprises one or more of a pesticide, a biological pesticide, an herbicide, an insecticide, a plant growth regulator, a biostimulant, a UV-protectant, a dust repellant, a hormone, a fertilizer, a micronutrient or combinations thereof.

10. The composition of claim 5, wherein the agricultural agent comprises chlorethoxyfos.

11. The composition of claim 5 or 10, wherein the agricultural agent comprises bifenthrin.

12. The composition of claim 5, wherein the agricultural agent is present in an amount from about 0.1% to about 60% by weight of the composition.

13. The composition of claim 5, further comprising a polymeric dispersant is selected from the group consisting of anionic polymeric dispersants, lignosulfonates, alkyl formaldehyde condensates, non-ionic polymeric dispersants, polyvinyl alcohols, and acrylic copolymers.

14. The composition of claim 13, wherein when the agricultural agent is part of a capsule suspension, the polymeric dispersant is an acrylic comb polymeric dispersant.

15. The composition of claim 13, wherein the polymeric dispersant is an anionic acrylic polymer.

16. The composition of claim 5, further comprising an additional rheology modifier.

17. The composition of claim 16, wherein the rheology modifier is selected from the group consisting of polysaccharides, xanthan gums, guar gums, locust gums, clays, silicas, starches, rheo-surfactants, and mixtures thereof.

18. The composition of claim 17, wherein the rheology modifier is present in an amount from about 0.01% to about 5% by weight of the suspension.

19. The composition of claim 5, further comprising ethanolamine.

20. A method of treating a crop comprising:

providing a composition comprising:

an agricultural agent in particulate form; and a microfibrillated cellulose, wherein the microfibrillated cellulose is present in an amount from about 0.01% to about 5% by dry weight of the composition;

wherein the particulate form is selected from a liquid droplet, a gel, an emulsifiable concentrate (EC), a capsule suspension (CS), a suspo-emulsion (SE), a microemulsion (ME), or an oil dispersion (OD); and wherein the microfibrillated cellulose is chemically unmodified; and adding to the composition a high ionic strength medium to provide a mixture.

21. The method of claim 20, wherein the high ionic strength medium comprises fertilizer.

* * * * *